United States Patent
O'Toole et al.

(10) Patent No.: US 12,136,726 B2
(45) Date of Patent: Nov. 5, 2024

(54) ASYMMETRIC ANODES FOR LITHIUM-BASED ENERGY STORAGE DEVICES

(71) Applicant: Graphenix Development, Inc., Williamsville, NY (US)

(72) Inventors: Terrence R. O'Toole, Webster, NY (US); John C. Brewer, Rochester, NY (US)

(73) Assignee: Graphenix Development, Inc., Williamsville, NY (US)

( * ) Notice: Subject to any disclaimer, the term of this patent is extended or adjusted under 35 U.S.C. 154(b) by 120 days.

(21) Appl. No.: 17/955,829

(22) Filed: Sep. 29, 2022

(65) Prior Publication Data

US 2023/0015866 A1    Jan. 19, 2023

Related U.S. Application Data

(63) Continuation of application No. 17/002,311, filed on Aug. 25, 2020, now Pat. No. 11,495,782.

(Continued)

(51) Int. Cl.
*H01M 4/04* (2006.01)
*H01M 4/131* (2010.01)
(Continued)

(52) U.S. Cl.
CPC ......... *H01M 4/0428* (2013.01); *H01M 4/131* (2013.01); *H01M 4/134* (2013.01);
(Continued)

(58) Field of Classification Search
CPC .... H01M 4/0428; H01M 4/131; H01M 4/134; H01M 4/136; H01M 4/1391;
(Continued)

(56) References Cited

U.S. PATENT DOCUMENTS

| 5,567,474 A | 10/1996 | Dover et al. |
| 5,776,369 A | 7/1998 | Dover et al. |

(Continued)

FOREIGN PATENT DOCUMENTS

| WO | 2013012334 A1 | 1/2013 |
| WO | 2015175509 A1 | 11/2015 |

(Continued)

OTHER PUBLICATIONS

Amine et al., "Novel Chemistry: Lithium Selenium and Selenium Sulfur Couple", Project ES280, Available Online at: https://www.energy.gov/sites/prod/files/2016/06/f32/es280_amine_2016_p_web.pdf, Jun. 6-10, 2016, 22 pages.

(Continued)

*Primary Examiner* — Stewart A Fraser
(74) *Attorney, Agent, or Firm* — Polsinelli LLP; David D. Hsu

(57) ABSTRACT

An anode for use in an energy storage device is provided. The anode includes a current collector having an electrically conductive substrate and a surface layer overlaying a first side of the electrically conductive substrate. The surface layer may include a metal oxide or a metal chalcogenide. The anode may also include a lithium storage layer overlaying the surface layer. The lithium storage layer may have a total content of silicon, germanium, or a combination thereof of at least 40 atomic %. The lithium storage layer may include less than 10 atomic % carbon. The anode may also include a plurality of lithium storage filamentary structures in contact with a second side of the electrically conductive substrate. The second side is opposite the first side. The plurality of lithium storage filamentary structures may include silicon, germanium, tin, or a combination thereof.

20 Claims, 8 Drawing Sheets

Related U.S. Application Data

(60) Provisional application No. 62/891,496, filed on Aug. 26, 2019.

(51) Int. Cl.

| | | |
|---|---|---|
| *H01M 4/134* | (2010.01) | |
| *H01M 4/136* | (2010.01) | |
| *H01M 4/1391* | (2010.01) | |
| *H01M 4/1395* | (2010.01) | |
| *H01M 4/1397* | (2010.01) | |
| *H01M 4/36* | (2006.01) | |
| *H01M 4/38* | (2006.01) | |
| *H01M 4/52* | (2010.01) | |
| *H01M 4/58* | (2010.01) | |
| *H01M 4/66* | (2006.01) | |
| *H01M 10/0525* | (2010.01) | |
| *H01M 4/02* | (2006.01) | |

(52) U.S. Cl.
CPC ......... *H01M 4/136* (2013.01); *H01M 4/1391* (2013.01); *H01M 4/1395* (2013.01); *H01M 4/1397* (2013.01); *H01M 4/366* (2013.01); *H01M 4/386* (2013.01); *H01M 4/52* (2013.01); *H01M 4/581* (2013.01); *H01M 4/661* (2013.01); *H01M 10/0525* (2013.01); *H01M 2004/027* (2013.01)

(58) Field of Classification Search
CPC .. H01M 4/1395; H01M 4/1397; H01M 4/366; H01M 4/386; H01M 4/52; H01M 4/581; H01M 4/661; H01M 10/0525; H01M 2004/027

See application file for complete search history.

(56) References Cited

U.S. PATENT DOCUMENTS

| | | | |
|---|---|---|---|
| 5,976,403 | A | 11/1999 | Dover et al. |
| 6,761,744 | B1 | 7/2004 | Tsukamoto et al. |
| 6,911,280 | B1 | 6/2005 | De Jonghe et al. |
| 7,378,041 | B2 | 5/2008 | Asao et al. |
| 7,413,982 | B2 | 8/2008 | Levy |
| 7,767,341 | B2 | 8/2010 | Kogetsu et al. |
| 8,257,866 | B2 | 9/2012 | Loveness et al. |
| 8,377,236 | B2 | 2/2013 | Yakovleva et al. |
| 8,906,523 | B2 | 12/2014 | Brantner |
| 9,281,515 | B2 | 3/2016 | Nazri |
| 9,293,771 | B2 | 3/2016 | Tani et al. |
| 9,325,014 | B2 | 4/2016 | Lee et al. |
| 9,376,455 | B2 | 6/2016 | Lee et al. |
| 10,014,552 | B1 | 7/2018 | Shnitser et al. |
| 10,115,960 | B2 | 10/2018 | Lee et al. |
| 10,164,252 | B2 | 12/2018 | Yang et al. |
| 10,686,214 | B2 | 6/2020 | Liu et al. |
| 10,910,653 | B2 | 2/2021 | Brewer et al. |
| 11,024,842 | B2 | 6/2021 | O'Toole et al. |
| 11,437,624 | B2 | 9/2022 | Brewer et al. |
| 11,495,782 | B2 | 11/2022 | O'toole et al. |
| 11,508,965 | B2 | 11/2022 | Brewer et al. |
| 2004/0191630 | A1 | 9/2004 | Kawamura et al. |
| 2005/0031958 | A1 | 2/2005 | Fukuoka et al. |
| 2006/0216604 | A1 | 9/2006 | Kawase et al. |
| 2007/0207381 | A1 | 9/2007 | Ohtsuka et al. |
| 2009/0162750 | A1 | 6/2009 | Kawakami et al. |
| 2010/0040951 | A1 | 2/2010 | Yamamoto et al. |
| 2010/0216026 | A1 | 8/2010 | Lopatin et al. |
| 2010/0285358 | A1 | 11/2010 | Cui et al. |
| 2010/0297502 | A1 | 11/2010 | Zhu et al. |
| 2010/0330421 | A1 | 12/2010 | Cui et al. |
| 2011/0111304 | A1* | 5/2011 | Cui .................. H01M 4/70 429/231.95 |
| 2011/0114254 | A1 | 5/2011 | Xu et al. |
| 2011/0159365 | A1 | 6/2011 | Loveness et al. |
| 2011/0266654 | A1 | 11/2011 | Kuriki et al. |
| 2012/0070741 | A1* | 3/2012 | Liu .................. H01M 4/1395 427/523 |
| 2012/0121983 | A1 | 5/2012 | Yoon et al. |
| 2013/0143124 | A1 | 6/2013 | Lee et al. |
| 2014/0011088 | A1* | 1/2014 | Lopatin .............. H01M 4/386 429/211 |
| 2014/0248543 | A1 | 9/2014 | Zhu et al. |
| 2015/0072119 | A1 | 3/2015 | George et al. |
| 2015/0118572 | A1 | 4/2015 | Lund et al. |
| 2015/0325852 | A1* | 11/2015 | Wang .................. H01M 4/386 429/231.95 |
| 2016/0190564 | A1 | 6/2016 | Samarao et al. |
| 2016/0197351 | A1* | 7/2016 | Tani .................. H01M 4/628 429/162 |
| 2016/0285081 | A1* | 9/2016 | Matsuno .............. H01M 4/386 |
| 2017/0133662 | A1 | 5/2017 | Cui et al. |
| 2017/0279163 | A1 | 9/2017 | Jang et al. |
| 2017/0301616 | A1 | 10/2017 | Biederman et al. |
| 2017/0335482 | A1 | 11/2017 | Date et al. |
| 2017/0338464 | A1 | 11/2017 | Fasching et al. |
| 2018/0083264 | A1 | 3/2018 | Soppe |
| 2018/0123132 | A1 | 5/2018 | Kawakami et al. |
| 2018/0145367 | A1 | 5/2018 | Busacca et al. |
| 2018/0166735 | A1 | 6/2018 | Busacca et al. |
| 2018/0287130 | A1 | 10/2018 | de Souza et al. |
| 2018/0358618 | A1 | 12/2018 | Tour et al. |
| 2019/0044151 | A1 | 2/2019 | Elam et al. |
| 2019/0097275 | A1 | 3/2019 | Mitlin et al. |
| 2019/0103231 | A1 | 4/2019 | Chai et al. |
| 2019/0140267 | A1 | 5/2019 | Gopalakrishnan Nair et al. |
| 2019/0207205 | A1 | 7/2019 | Adair et al. |
| 2019/0267361 | A1 | 8/2019 | Rahim et al. |
| 2021/0050584 | A1 | 2/2021 | Brewer et al. |
| 2021/0050591 | A1 | 2/2021 | Brewer et al. |
| 2021/0050593 | A1 | 2/2021 | Brewer et al. |
| 2021/0057733 | A1 | 2/2021 | Brewer et al. |
| 2021/0057755 | A1 | 2/2021 | Brewer et al. |
| 2021/0057757 | A1 | 2/2021 | Brewer et al. |

FOREIGN PATENT DOCUMENTS

| | | |
|---|---|---|
| WO | 2016112333 A1 | 7/2016 |
| WO | 2019165412 A1 | 8/2019 |
| WO | 2021029769 A1 | 2/2021 |
| WO | 2021241130 A1 | 12/2021 |

OTHER PUBLICATIONS

Beattie et al., "Understanding Capacity Fade in Silicon Based Electrodes for Lithium-Ion Batteries Using Three Electrode Cells and Upper Cut-Off Voltage Studies", Journal of Power Sources, vol. 302, Jan. 20, 2016, pp. 426-430.

Cho et al., "Electrochemical Properties of Si Film Electrodes Grown on Current Collectors with CuO Nanostructures for Thin-Film Microbatteries", Journal of Nanoscience and Nanotechnology, vol. 14, No. 12, Dec. 1, 2014, pp. 9300-9306.

Cho et al., "Enhanced Lithium Ion Battery Cycling of Silicon Nanowire Anodes by Template Growth to Eliminate Silicon Underlayer Islands", NANO Letters, vol. 13, No. 11, Nov. 13, 2013, pp. 5740-5747.

Christopherson, "Battery Test Manual for Electric Vehicles, Revision 3", Idaho National Lab, Jun. 1, 2015, 67 pages.

Corte, "Effets Du Traitement Chimique De La Surface D'une Électrode Négative en Silicium Amorphe Pour Batterie Lithium-ion: Étude Par Spectroscopie Infrarouge in Situ", Ecole Polytechnique Paristech, Oct. 2013, pp. 1-139.

Domi et al., "Effect of Mechanical Pre-Lithiation on Electrochemical Performance of Silicon Negative Electrode for Lithium-Ion Batteries", Journal of The Electrochemical Society, vol. 164, No. 7, 2017, pp. A1651-A1654.

Fotouhi et al., "Lithium-Sulfur Battery Technology Readiness and Applications—A Review", Energies, vol. 10, No. 12, Nov. 2017, pp. 1-15.

(56) References Cited

OTHER PUBLICATIONS

Gomez-Baquero, "Silicon Anodes to Enable Better Lithium Ion Batteries", Advanced Energy Conference 2016, Javits Center, Apr. 2016, pp. 1-28.
Holstiege et al., "Pre-Lithiation Strategies for Rechargeable Energy Storage Technologies: Concepts, Promises and Challenges", Batteries, vol. 4, No. 1, Jan. 2018, pp. 1-39.
Kim et al., "Electrochemical Characteristics of Si/Mo Multilayer Anode for Li ion Batteries", Revista Mexicana De Fisica, vol. 53, No. 1, Jan. 2007, pp. 17-20.
Kundu et al., "Structural Studies of Copper Sulfide Films: Effect of Ambient Atmosphere", Science and Technology of Advanced Materials, vol. 9, No. 3, Oct. 8, 2008, pp. 1-6.
Li et al., "One-Step Synthesis of Li-Doped NiO as High-Performance Anode Material for Lithium Ion Batteries", Ceramics International, vol. 42, No. 13, Jun. 2016, pp. 14565-14572.
Lin et al., "Lithium Superionic Sulfide Cathode for All-Solid Lithium-Sulfur Batteries", American Chemical Society Nano, vol. 7, No. 3, Feb. 2013, pp. 2829-2833.
Lin et al., "Optical Characterization of Hydrogenated Amorphous Silicon Thin Films Deposited at High Rate", Journal of Electronic Materials, vol. 28, No. 12, Aug. 1999, pp. 1452-1456.
Lin et al., "Reviving the Lithium Metal Anode for High-Energy Batteries", Nature Nanotechnology, vol. 12, Mar. 7, 2017, pp. 194-206.
Nominanda et al., "Process and Material Properties of PECVD Boron-Doped Amorphous Silicon Film", Available Online at: https://www.electrochem.org/dl/ma/201/pdfs/0399.pdf, 2002, 1 page.
Notten, "Advanced Energy Storage Materials for Battery Applications, Advanced Materials", NL Agency Ministry of Economic Affairs, Agriculture and Innovation, Dec. 12, 2012, 50 pages.
Piwko et al., "Hierarchical Columnar Silicon Anode Structures for High Energy Density Lithium Sulfur Batteries", Journal of Power Sources, vol. 351, 2017, pp. 183-191.
Quiroga-Gonzalez et al., "Optimal Conditions for Fast Charging and Long Cycling Stability of Silicon Microwire Anodes for Lithium Ion Batteries, and Comparison with the Performance of Other Si Anode Concepts", Energies, vol. 6, No. 10, Oct. 10, 2013, pp. 5145-5156.
Sakabe et al., "Porous Amorphous Silicon Film Anodes for High-Capacity and Stable All-Solid-State Lithium Batteries", Communications Chemistry, vol. 1, No. 24, May 3, 2018, pp. 1-9.
Salah et al., "Pure Silicon Thin-Film Anodes for Lithium-Ion Batteries: A Review", Journal of Power Sources, vol. 414, Feb. 28, 2019, pp. 48-67.
Soppe et al., "Self-Organized Nano-Structures Silicon as Anode Material for Li-Ion Batteries", Meeting of Materials Research Society, Apr. 2-6, 2018, 1 page.
Stefan, "A Commercially Scalable Process for Silicon Anode Prelithiation", DOE Merit Review, Amprius Incorporated, Project ES250, Available Online at: https://www.energy.gov/sites/prod/files/2016/06/f32/es250_stefan_2016_o_web.pdf, Jun. 6-10, 2016, pp. 1-23.
Sun, "Nanomembranes Based on Nickel Oxide and Germanium as Anode Materials for Lithium-Ion Batteries", Dissertation, Sep. 27, 2017, 116 pages.
Uehara et al., "Thick Vacuum Deposited Silicon Films Suitable for the Anode of Li-Ion Battery", Journal of Power Sources, Science Direct, vol. 146, No. 1-2, Aug. 26, 2005, pp. 441-444.
Ulvestad et al., "Silicon Nitride as Anode Material for Li-Ion Batteries: Understanding the SiNx Conversion Reaction", Journal of Power Sources, vol. 399, Sep. 30, 2018, pp. 414-421.
Ulvestad et al., "Silicon Nitride Coated Silicon Thin Films as Anodes for Li-Ion Batteries", Electronic Clearing Service Transactions, vol. 64, No. 22, Apr. 2015, pp. 107-111.
Valladares et al., "Characterization of Ni Thin Films Following Thermal Oxidation in Air", Journal of Science Technology B, vol. 32, No. 5, Sep.-Oct. 2014, pp. 051808-1-051808-8.
Wu et al., "Silicon Nitride Coated Silicon Thin Film on Three Dimensions Current Collector for Lithium Ion Battery Anode", Journal of Power Sources, vol. 325, Sep. 1, 2016, pp. 64-70.
Xu et al., "A High-Performance Li-Ion Anode From Direct Deposition of Si Nanoparticles", Nano Energy, vol. 38, Jun. 2017, pp. 477-485.
Xu et al., "Engineering the Direct Deposition of Si Nanoparticles for Improved Performance in Li-Ion Batteries", Journal of the Electrochemical Society, vol. 166, No. 3, Dec. 28, 2018, pp. A5252-A5258.
Yang, "Development of Silicon-Based Anodes and In-Situ Characterization Techniques for Lithium Ion Batteries", Jinho Yang Dissertation, Wayne State University, Jan. 1, 2014, 125 pages.
Yuan et al., "High-Performance CuO/Cu Composite Current Collectors with Array-Pattern Porous Structures For Lithium-Ion Batteries", Electrochimica Acta, vol. 226, Feb. 1, 2017, pp. 89-97.
Zhao et al., "A General Prelithiation Approach for Group IV Elements and Corresponding Oxides", Energy Storage Materials, Jul. 2017, pp. 1-7.

\* cited by examiner

ASYMMETRIC ANODES FOR LITHIUM-BASED ENERGY STORAGE DEVICES

CROSS REFERENCE TO RELATED APPLICATION

This application is a continuation of U.S. application Ser. No. 17/002,311, filed Aug. 25, 2020, which claims the benefit of priority of U.S. Provisional Application No. 62/891,496, filed Aug. 26, 2019, the contents of which are incorporated herein by reference in their entirety for all purposes.

TECHNICAL FIELD

The present disclosure relates to lithium ion batteries and related energy storage devices.

BACKGROUND

Silicon has been proposed for lithium-ion batteries to replace the conventional carbon-based anodes, which have a storage capacity that is limited to ~370 mAh/g. Silicon readily alloys with lithium and has a much higher theoretical storage capacity (~3600 to 4200 mAh/g at room temperature) than carbon anodes. However, insertion and extraction of lithium into the silicon matrix causes significant volume expansion (>300%) and contraction. This can result in rapid pulverization of the silicon into small particles and electrical disconnection from the current collector.

The industry has recently turned its attention to nano- or micro-structured silicon to reduce the pulverization problem, i.e., silicon in the form of spaced apart nano- or micro-wires, tubes, pillars, particles and the like. The theory is that making the structures nano-sized avoids crack propagation and spacing them apart allows more room for volume expansion, thereby enabling the silicon to absorb lithium with reduced stresses and improved stability compared to, for example, macroscopic layers of bulk silicon.

Despite research into various approaches batteries based primarily on silicon have yet to make a large market impact due to unresolved problems.

SUMMARY

There remains a need for anodes for lithium-based energy storage devices such as Li-ion batteries that are easy to manufacture, robust to handling, high in charge capacity and amenable to fast charging, for example, at least 1C, and long in charge/discharge cycle lifetime.

In accordance with an embodiment of the present disclosure, a method of making an anode for use in an energy storage device includes providing a current collector having an electrically conductive substrate and a surface layer overlaying a first side of the electrically conductive substrate. A second side of the electrically conductive substrate includes a filament growth catalyst, wherein the second side is opposite the first side. The method further includes depositing a lithium storage layer onto the surface layer using a first CVD process forming a plurality of lithium storage filamentary structures on the second side of the electrically conductive substrate using a second CVD process.

The present disclosure provides anodes for energy storage devices that may have one or more of at least the following advantages relative to conventional anodes: improved stability at aggressive ≥1C charging rates; higher overall areal charge capacity; higher charge capacity per gram of silicon; improved physical durability; simplified manufacturing process; and more reproducible manufacturing process. Anodes and energy storage devices of the present disclosure may also have other advantages.

DETAILED DESCRIPTION

It is to be understood that the drawings are for purposes of illustrating the concepts of the disclosure and may not be to scale. Various aspects of anodes of the present disclosure, including metal oxide layers, deposition of lithium storage material, additional layers and methods are described in co-pending U.S. patent application Ser. Nos. 16/285,842, 16/909,008, 16/991,613, 16/991,623, and 16/991,626, the entire contents of which are incorporated by reference for all purposes.

Anode Overview

Figure 1:
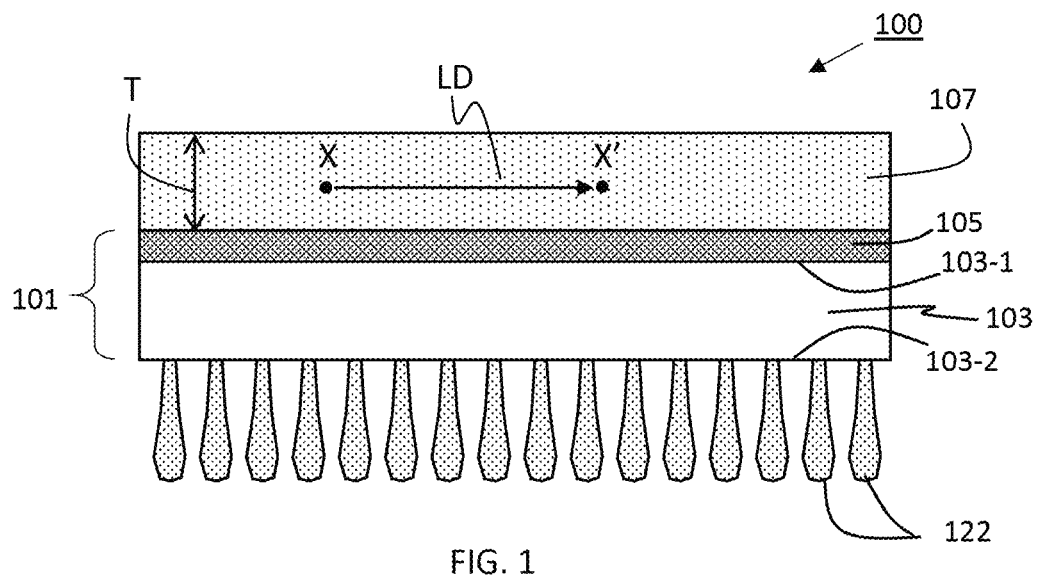
FIG. 1 is a cross-sectional view of an anode according to some embodiments of the present disclosure.
Figure 2:
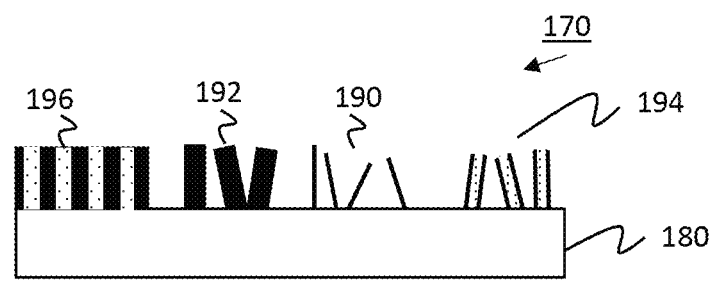
FIG. 2 is a cross-sectional view of a prior art anode having nanostructures.

FIG. 1 is a cross-sectional view according to some embodiments of the present disclosure. Anode 100 includes current collector 101. Current collector 101 includes a surface layer 105 overlaying a first side 103-1 of an electrically conductive substrate 103. A lithium storage layer 107 overlays the surface layer, and a plurality of lithium storage filamentary structures 122 are in contact with a second side 103-2 of the electrically conductive substrate, the second side opposite the first side.

As described in more detail below, in some embodiments, the electrically conductive substrate 103 may be a conductive foil or mesh, e.g., one including copper, nickel, titanium, stainless steel, or a conductive carbon. As described in more detail below, in some embodiments, the surface layer may include a metal oxide, for example, an oxide of nickel, copper, or titanium. In some embodiments, the surface layer may include a metal chalcogenide, for example, a sulfide or polysulfide of copper or nickel. As described in more detail below, in some embodiments, the lithium storage layer may include at least 40 atomic % of silicon, germanium, or a combination thereof. In some embodiments, the lithium storage layer may be porous and/or continuous, e.g., a continuous porous lithium storage layer. In some embodiments, the lithium storage filamentary structures may include silicon, germanium, tin, or a combination thereof. In some embodiments, the lithium storage filamentary structures may include nanostructures such as nanowires or nanopillars. In some embodiments, the lithium storage layer or the lithium storage filamentary structures, or both, may be deposited or formed using a chemical vapor deposition (CVD) process including, but not limited to, hot-wire CVD or a plasma-enhanced chemical vapor deposition (PECVD). In some embodiments the lithium storage layer may be deposited using the same or different CVD process as used to form the lithium storage filamentary structures. In some embodiments, the lithium storage layer may be deposited concurrently with formation of the lithium storage filamentary structures, or in a separate step. In some embodiments, a surface layer having a metal oxide may favor deposition of silicon in the form of a continuous porous lithium storage layer and a surface having bare metal such as nickel may favor formation of silicon in the form of lithium storage filamentary structures, even under identical conditions.

In some embodiments, the lithium storage layer may be substantially free of nanostructures, e.g., in the form of spaced-apart wires, pillars, tubes or the like, or in the form of regular, linear vertical channels extending through the lithium storage layer The term "nanostructure" herein generally refers to an active material structure (for example, a structure of silicon, germanium or their alloys) having at least one cross-sectional dimension that is less than about 2,000 nm, other than a dimension approximately normal to an underlying substrate (such as a layer thickness) and excluding dimensions caused by random pores and channels. Similarly, the terms "nanowires", "nanopillars" and "nanotubes" refers to wires, pillars and tubes, respectively, at least a portion of which, have a diameter of less than 2,000 nm. "High aspect ratio" nanostructures have an aspect ratio greater than 4, where the aspect ratio is generally the height or length of a feature (which may be measured along a feature axis aligned at an angle of 45 to 90 degrees relative to the underlying current collector surface) divided by the width of the feature (which may be measured generally orthogonal to the feature axis). In some embodiments, the lithium storage layer is considered "substantially free" of nanostructures when the anode has an average of fewer than 10 nanostructures per 1600 square microns (in which the number of nanostructures is the sum of the number of nanowires, nanopillars, and nanotubes in the same unit area), such nanostructures having an aspect ratio of 4:1 or higher. Alternatively, there is an average of fewer than 1 such nanostructures per 1600 square micrometers. Note that in some embodiments, the current collector may have a high surface roughness or the surface layer may include nanostructures, but these features are separate from the lithium storage layer.

In some embodiments, deposition conditions are selected in combination with the surface layer so that the lithium storage layer is relatively smooth providing an anode with diffuse or total reflectance of at least 10% at 550 nm, alternatively at least 20% (measured at the lithium storage layer side). In some embodiments, the lithium storage layer side of the anode may have lower reflectance than cited above, for example, by providing a current collector having a rough surface or by modifying deposition conditions of the lithium storage layer.

The anode can be a continuous foil or sheet but can alternatively be a mesh or have some other 3-dimensional structure. In some embodiments, the anode is flexible.

Electrically Conductive Substrate

In some embodiments, the electrically conductive substrate includes a metallic material. In some embodiments, the metallic material includes a transition metal. In some embodiments, the metallic material includes titanium (or its alloys), nickel (or its alloys), copper (or its alloys), or stainless steel. In some embodiments, the electrically conductive substrate includes an electrically conductive carbon, such as carbon black, graphene, graphene oxide, reduced graphene oxide graphite, carbon nanotubes, or fullerene. In some embodiments the electrically conductive substrate may be in the form of a foil or sheet of conductive material, or alternatively a mesh structure or fabric-like structure, or alternatively a multilayer structure (discussed below). In some embodiments the electrically conductive substrate may have a conductivity of at least $10^3$ S/m, or alternatively at least $10^6$ S/m, or alternatively at least $10^7$ S/m, and may include inorganic or organic conductive materials or a combination thereof.

In some embodiments, the electrically conductive substrate has an average thickness (measured between first side and second side) of at least 0.1 μm, alternatively at least 1 μm, alternatively at least 5 μm. In some embodiments, the electrically conductive substrate has an average thickness in a range of 0.1 μm to 1 μm, alternatively 1 μm to 2 μm, alternatively 2 μm to 5 μm, alternatively 5 μm, to 10 μm, alternatively 10 μm to 15 μm, alternatively 15 μm to 20 μm, alternatively 20 μm to 30 μm, alternatively 30 μm to 50 μm, alternatively 50 μm to 100 μm, or any combination of contiguous ranges thereof.

Figure 3A:
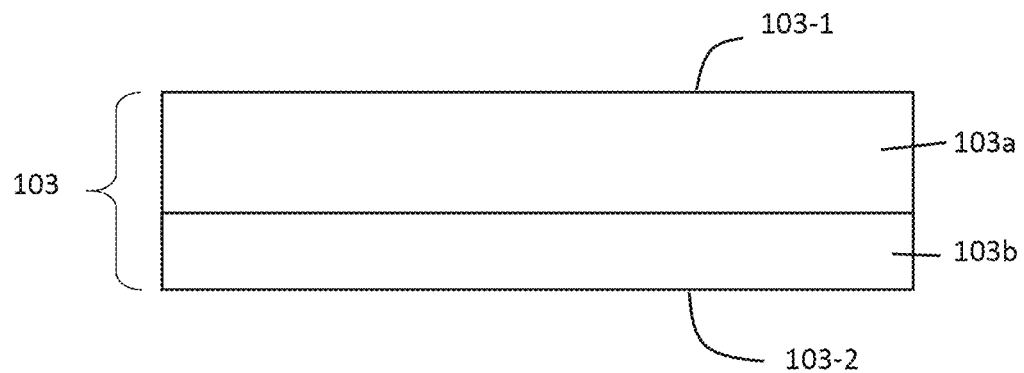
FIG. 3A is a cross-sectional view of an electrically conductive substrate according to some embodiments of the present disclosure.

In some embodiments, the electrically conductive substrate includes a multilayer structure. For example, as shown in FIG. 3A, electrically conductive substrate 103 may include a first electrically conductive layer 103a in contact with a second electrically conductive layer 103b having a different chemical composition than the first electrically conductive layer 103a. The surface of electrically conductive layer 103a corresponds to the first side 103-1 of the electrically conductive substrate 103, and the surface of electrically conductive layer 103b corresponds to the second side 103-2 of electrically conductive substrate 103. The first or second electrically conductive layer may include any of the materials mentioned above for use in the electrically conductive substrate. They may have the same or different thickness or surface roughness. In some embodiments, the first electrically conductive layer includes copper and the second electrically conductive layer includes nickel. Although not shown, an electrically conductive substrate may include additional electrically conductive layers in between the first and second electrically conductive layers.

Figure 3B:
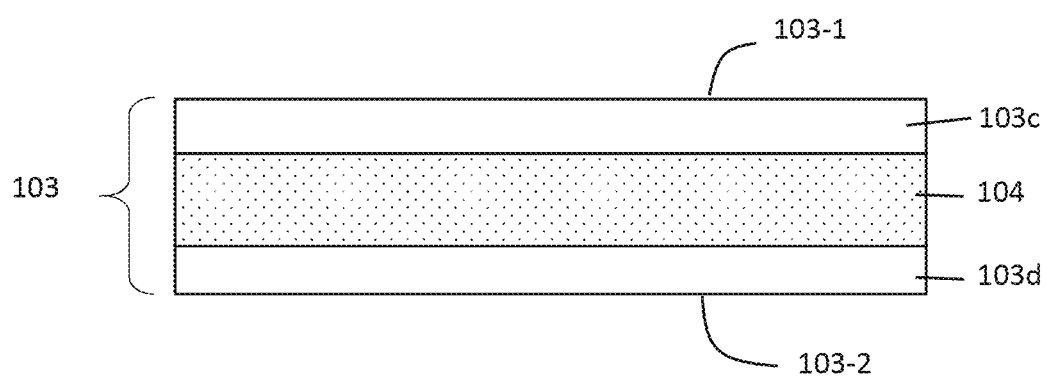
FIG. 3B is a cross-sectional view of an electrically conductive substrate according to some embodiments of the present disclosure.

In some embodiments, as shown in FIG. 3B, electrically conductive substrate 103 may include an electrically insulating layer 104 provided between a first electrically conductive layer 103c and a second electrically conductive layer 103d. The surface of electrically conductive layer 103c corresponds to the first side 103-1 of the electrically conductive substrate 103, and the surface of electrically conductive layer 103d corresponds to the second side 103-2 of electrically conductive substrate 103. The first or second electrically conductive layer may include any of the materials mentioned above for use in the electrically conductive substrate, and they may be the same or different with respect to chemical composition, thickness, or surface roughness. The two sides separated by an insulating layer may enable the lithium storage layer to be electrically addressable independently of the lithium storage filamentary structures, which may allow for greater overall battery operational flexibility. For example, the operating voltage or current on one side may be optimized for high charge capacity and the other may be optimized for high charging rates. In some embodiments, the operating voltage on one side may be within 20%, 10%, or 5% of the operating voltage for the other side. Insulating layer 104 may include a polymer, a glass, a ceramic, or some other electrically insulative material. In some embodiments, the insulating layer 104 includes a thermally stable material capable of temperature excursions that may be used for forming the surface layer, the lithium storage layer or the lithium storage filamentary structures, e.g., any loss in manufacturing yield attributable to thermal degradation of the insulating layer is less than 10%. In some embodiments, the insulating layer comprises a material that is thermally stable for at least 30 minutes at a temperature in a range of 50° C. to 150° C., alternatively 150° C. to 250° C., alternatively 250° C. to 350° C., alternatively 350° C. to 450° C., alternatively 450° C. to 550° C., alternatively 550° C. to 650° C., or any combination of contiguous ranges thereof.

Surface Layer

The surface layer should be sufficiently electrically conductive (e.g., is at least semi-conducting, or non-insulating) to allow transfer of electrical charge between the electrically conductive substrate and the lithium storage layer. The surface layer may include dopants that promote electrical conductivity.

In some embodiments, the surface layer has an average thickness of at least 0.002 μm, alternatively at least 0.005 μm, alternatively at least 0.010 μm, alternatively at least 0.020 μm, alternatively at least 0.050 μm, alternatively at least 0.1 μm, alternatively at least 0.2 μm, or alternatively at least 0.5 μm. In some embodiments, the surface layer has an average thickness in a range of about 0.002 μm to about 10 μm, alternatively in a range of about 0.002 μm to about 0.010 μm, alternatively in a range of about 0.010 μm to about 0.050 μm, alternatively in a range of about 0.005 μm to about 0.10 μm, alternatively in a range of about 0.10 μm to about 0.40 μm, alternatively in a range of about 0.40 μm to about 0.70 μm, alternatively in a range of about 0.70 μm to about 1.0 μm, alternatively in a range of about 1.0 μm to about 2.0 μm, alternatively in a range of about 2.0 μm to about 5.0 μm, alternatively in a range of about 5.0 μm to about 10 μm, or any combination of contiguous ranges thereof.

The surface layer may include two or more sublayers having different chemical compositions.

When forming or depositing the surface layer or sublayers on the first side 103-1 of the electrically conductive substrate 103, the second side 103-2 may be oriented, covered, treated, or coated (e.g., with a removable material such as an organic polymer), to prevent unwanted deposition or formation of metal oxide or metal chalcogenide on the second side Metal Oxide Surface Layer In some embodiments, the surface layer includes a metal oxide. In some embodiments, the surface layer may include or be referred to as a metal oxide layer. The metal oxide layer may include a stoichiometric oxide, a non-stoichiometric oxide, or both. In some embodiments, the metal within the metal oxide layer may exist in multiple oxidation states. The metal oxide layer may include a mixture of metal oxides having homogeneously or heterogeneously distributed oxide stoichiometries, mixtures of metals, or both. In some embodiments, the metal oxide layer may have a gradient of oxygen content where the atomic % of oxygen adjacent to an electrically conductive substrate is lower than the atomic % adjacent to the lithium storage layer. The metal oxide layer may include dopants or regions of unoxidized metal that promote electrical conductivity.

In some embodiments, the metal oxide layer includes a transition metal oxide, e.g., an oxide of nickel, titanium, or copper. In some embodiments, the metal oxide layer includes an oxide of aluminum. In some embodiments, the metal oxide layer is an electrically conductive doped oxide, including but not limited to, indium-doped tin oxide (ITO) or an aluminum-doped zinc oxide (AZO). In some embodiments, the metal oxide layer includes an alkali metal oxide or alkaline earth metal oxide. In some embodiments, the metal oxide layer includes an oxide of lithium. As mentioned, the metal oxide layer may include mixtures of metals. For example, an "oxide of nickel" may optionally include other metals in addition to nickel. In some embodiments, the metal oxide layer includes an oxide of an alkali metal (e.g., lithium or sodium) or an alkaline earth metal (e.g., magnesium or calcium) along with an oxide of a transition metal (e.g., nickel or copper). In some embodiments, the metal oxide layer may include a small amount of hydroxide such that the ratio of oxygen atoms in the form of hydroxide relative to oxide is less than 0.25.

In some embodiments, surface layer 105 includes a metal oxide (a "metal oxide-containing surface layer") and is formed directly by atomic layer deposition (ALD), a CVD process, evaporation, or sputtering onto the first side 103-1 of the electrically conductive substrate 103. The second side 103-2 may be oriented, covered, treated, or coated in some way, e.g., with a removable polymer, to prevent unwanted deposition on the second side. In some embodiments, the electrically conductive substrate 103 includes a metal, at least at the first side 103-1, and a metal oxide-containing surface layer 105 is formed by oxidizing a portion of the metal at the first side 103-1 of the electrically conductive substrate 103. For example, the metal can be thermally oxidized in the presence of oxygen, electrolytically oxidized, chemically oxidized in an oxidizing liquid or gaseous medium or the like to form a metal oxide-containing surface layer 105. The second side 103-2 may be oriented, covered, treated, or coated in some way, e.g., with a removable polymer, to avoid unwanted metal oxide formation. In some embodiments, the second side 103-2 of the electrically conductive substrate 103 may include a material that does not readily oxidize to form a metal oxide.

In some embodiments, a metal oxide layer precursor composition may be coated or printed over the first side 103-1 of the electrically conductive substrate 103 then treated to form a metal oxide-containing surface layer 105. Some non-limiting examples of metal oxide precursor compositions include sol-gels (metal alkoxides), metal carbonates, metal acetates (including organic acetates), metal hydroxides, and metal oxide dispersions. The metal oxide precursor composition may be thermally treated to form the metal oxide layer. In some embodiments, room temperature may be sufficient temperature to thermally treat the precursor. In some embodiments, a metal oxide precursor composition is thermally treated by exposure to a temperature of at least 50° C., alternatively in a range of 50° C. to 150° C., alternatively in a range of 150° C. to 250° C., alternatively in a range of 250° C. to 350° C., alternatively in a range of 350° C. to 450° C., or any combination of these ranges. Thermal treatment time depends on many factors, but may optionally be at least 0.1 minute, alternatively in a range of 1 to 120 minutes, to form the metal oxide layer. In some embodiments, thermal treatment may be carried out using an oven, a tube furnace, infrared heating elements, contact with a hot plate or exposure to a flash lamp. In some embodiments, the metal oxide precursor composition is treated by exposure to reduced pressure to form the metal oxide, e.g., to drive off solvents or volatile reaction products. The reduced pressure may be less than 100 Torr, alternatively in a range of 0.1 to 100 Torr. Exposure time to the reduced pressure may optionally be at least 0.1 minute, alternatively in a range of 1 to 120 minutes. In some embodiments, both reduced pressure and thermal treatment may be used.

In some embodiments, the metal oxide layer precursor composition includes a metal, e.g., metal-containing particles, that is treated with an oxidant (e.g., as previously described) under conditions where the oxide layer precursor is readily oxidized but underlying electrically conductive substrate is less so. The metal oxide precursor composition may include a metal that is the same as or different from the metal(s) of the electrically conductive substrate. In some embodiments, multiple metal precursor compositions may be used to form a pattern of different metal oxides or multilayer structure of different metal oxides.

In some embodiments, the metal oxide is formed in the same chamber as, or in line with, a tool used to deposit the lithium storage layer. Doped metal oxide layers can be formed by adding dopants or dopant precursors during the metal oxide formation step, or alternatively by adding dopants or dopant precursors to a surface of an electrically conductive substrate prior to the metal oxide layer formation step, or alternatively treating a metal oxide layer with a dopant or dopant precursor after initial formation of the metal oxide layer. In some embodiments, the metal oxide layer itself may have some reversible or irreversible lithium storage capacity. In some embodiments, the reversible areal capacity of the metal oxide layer is lower than that of the lithium storage layer. In some embodiments, the metal oxide layer may be porous. In some embodiments, a porous metal oxide may have a density lower than the density of a non-porous metal oxide. In some embodiments, the density of a porous metal oxide is in a range of 50% to 60% of the density of a non-porous metal oxide, alternatively 60% to 70%, alternatively 70% to 80%, alternatively 80% to 90%, alternatively 90% to 95%, alternatively 95% to 99%, or any combination of contiguous ranges thereof.

In some embodiments, the metal oxide may be provided in a pattern over the first side 103-1 of electrically conductive substrate as disclosed in U.S. patent application Ser. No. 16/909,008, the entire contents of which are incorporated herein.

In some embodiments, the metal oxide layer is formed by oxidizing a surface region of first side of metal-containing electrically conductive substrate, for example, oxidation of a first side of a metal foil such as nickel foil, but not the second side. The non-oxidized portion of the metal foil acts as the electrically conductive substrate and the oxidized portion corresponds to the metal oxide layer. This method is amenable to high-volume and low-cost production of current collectors. The oxidation conditions depend upon the metal/metal surface, the target oxide thickness and the desired oxide porosity. Unless otherwise stated, any reference to a particular metal includes alloys of that metal. For example, nickel foil may include pure nickel or any alloy of nickel wherein nickel is the primary component. In some embodiments, an alloy metal also oxidizes, and the oxide of nickel formed from the alloy may include that corresponding oxidized metal. In some embodiments, the current collector is formed by oxidation of a nickel substrate, e.g., a nickel foil, in ambient air in a furnace brought to a temperature of at least 300° C., alternatively at least 400° C., for example in a range of about 600° C. to about 900° C., or alternatively higher temperatures. The hold time depends upon the selected temperature and the desired thickness/porosity for the metal oxide layer. Typically, the oxidation hold time will be in a range of about 1 minute to about 2 hours, but shorter or longer times are contemplated. A surface pretreatment step may be applied to promote or otherwise control oxidation. Other metals such as copper and titanium may have other operational hold times, temperatures and pretreatments according to their propensity to be oxidized.

Metal Chalcogenide Surface Layer

In some embodiments, the surface layer may include a metal chalcogenide. Herein, the term "metal chalcogenide" refers to a metal chalcogenide material that includes at least one of sulfur or selenium, and in some embodiments may include both. The metal chalcogenide material may include a metal sulfide, a metal polysulfide, a metal selenide, or a metal polyselenide, or a mixture thereof. A metal sulfide may generally refer to a compound where the metal is associated with a sulfur atom in the form of $S^{2-}$. A metal polysulfide may generally refer to a compound where the metal is associated with a chain of sulfur atoms in the form of $S_n^{2-}$ where n≥2. Similarly, a metal selenide may generally refer to a compound where the metal is associated with a selenium atom in the form of $Se^{2-}$. A metal polyselenide may generally refer to a compound wherein the metal is associated with a chain of selenium atoms in the form of $Se_n^{2-}$ where n≥2. In some embodiments, metal chalcogenides may have complex structures. In some embodiments, the metal chalcogenide may include a mixture of sulfur- and selenium-containing moieties. In the present disclosure, a surface layer may be considered to include: a metal sulfide so long as it includes a metal and least one identifiable $S^{2-}$ species; or a metal selenide so long as it includes a metal and at least one identifiable $Se^{2-}$ species; or a metal polysulfide so long as it includes a metal and at least one identifiable $S_n^{2-}$ species with n≥2; or a metal polyselenide so long as it includes a metal and at least one identifiable $Se_n^{2-}$ species with n≥2. A metal chalcogenide including $(S_mSe_p)^{2-}$ where m and p are each at least 1, may be equally referred to as a metal polysulfide or a polyselenide for the purposes of this disclosure.

The chalcogenide may include a stoichiometric or non-stoichiometric mixture of elements with respect to the metal oxidation state. The surface layer may include a mixture of metal chalcogenides having homogeneously or heterogeneously distributed sulfur or selenium, mixtures of metals, or mixtures of metal oxidation states. In some embodiments, the metal chalcogenide material may include a transition metal sulfide, a transition metal polysulfide, a transition metal selenide, a transition metal polyselenide, or mixture thereof. The transition metal may be a single transition metal or a mixture of transition metals. In some embodiments, the metal chalcogenide material may include at least one of Ti, V, Cr, Mn, Fe, Co, Ni, Cu, Zn, Ga, or In.

In some embodiments, the metal chalcogenide material may include a copper sulfide, a copper polysulfide, a copper selenide, a copper polyselenide, or a mixture thereof. The copper of the metal chalcogenide material may have an oxidation state of (I), (II) or a mixture of both. In some embodiments, the surface layer may include a copper chalcogenide according to formula 1:

$$Cu_x [S_m Se_p] \quad (1)$$

where $1 \leq x \leq 2$, $(m+p) \geq 1$, and the average oxidation state of Cu=2/x. In some embodiments, a surface layer may include a copper chalcogenide of formula (1) in addition to some Cu(0) metal.

In some embodiments, the surface layer may further include one or more metal oxides (for example, those described above) in addition to the metal chalcogenide. The metal element of the metal oxide may be the same as that of the metal chalcogenide or different. In some embodiments, the metal oxide may be a transition metal oxide. In some embodiments, the metal oxide may include one or more of Ti, V, Cr, Mn, Fe, Co, Ni, Cu, Zn, Ga, or In. In some embodiments, the metal oxide may include lithium, optionally in addition to another metal. In some embodiments, the surface layer may include a homogeneous or heterogeneous mixture of one or more metal chalcogenides with one or more metal oxides.

In some embodiments, the surface layer may include an oxygen-containing copper chalcogenide having the formula 2:

$$Cu_x [(S_m Se_p)_y O_{(1-y)}] \quad (2)$$

where $1 \leq x \leq 2$, $(m+p) \geq 1$, $0 < y < 1$, and the average oxidation state of Cu=2/x.

In some embodiments, the surface layer may include two or more sublayers, at least one of which includes a metal chalcogenide having at least one of sulfur or selenium. In some embodiments, the surface layer may include at least one sublayer having a sulfur- or selenium-containing metal chalcogenide and one sublayer having a metal oxide. In some embodiments, a first sublayer having a sulfur- or selenium-containing metal chalcogenide is disposed in contact with the first side 103-1 of electrically conductive substrate and a second sublayer having a metal oxide is provided over the first sublayer and in contact with the lithium storage layer 107. In some embodiments, the second sublayer having the metal oxide is thinner than the first sublayer. In some embodiments, the electrically conductive substrate may include copper metal, and a surface layer may include a first sublayer of a copper sulfide or a copper polysulfide in contact with the copper metal and a second sublayer of titanium dioxide over first sublayer.

In some embodiments, the surface layer may include a metal chalcogenide wherein the metal includes a mixture of a transition metal and lithium.

In some embodiments, the metal chalcogenide may be formed directly over the first side 103-1 of the electrically conductive substrate by atomic layer deposition (ALD), CVD, evaporation, or sputtering.

In some embodiments, the electrically conductive substrate includes a metal, at least at the first side 103-1, and the surface layer may be formed by treating a portion of the metal at the first side 103-1 of the electrically conductive metal layer with an agent to form the metal chalcogenide, wherein at least some of metal chalcogenide includes the metal(s) of the electrically conductive substrate. In some non-limiting examples, the reagent may be applied: a) as a vapor, e.g., vaporized sulfur; b) from a reduced pressure system, e.g., sulfur from a sulfur-valved cracker (VCC) effusion cell; c) from a solution, e.g., liver of sulfur solution, or a solution including one or more of a polysulfide salt, a thiosulfate salt, or a polyselenide salt; d) by contact with a reactive sulfur- or selenium-containing solid; or) by electrochemical reaction in a solution comprising a sulfur or selenium source. Treating may further include a heating step.

In some embodiments, a metal oxide precursor layer is first formed on the first side 103-1 of electrically conductive substrate and then treated to first form the metal chalcogenide. The metal oxide precursor layer may include a precursor that includes a metal oxide. The precursor may then be converted to the metal chalcogenide. Methods of forming or depositing a metal oxide onto the electrically conductive substrate have been discussed above. Some or all of the metal oxide precursor layer may be treated to cause sulfurization or selenization to form the metal chalcogenide material, for example, a metal sulfide, a metal polysulfide, a metal selenide, or a metal polyselenide. In some embodiments, treatment of the metal oxide precursor layer includes treatment with a solution, e.g., one including one or more of a sulfide salt, a polysulfide salt, a thiosulfate salt, a selenide salt, or a polyselenide salt. Treating may further include a heating step. In some embodiments, not all of the metal oxide of the metal oxide precursor layer is converted and the surface layer may further include some metal oxide.

In some embodiments, a surface layer precursor composition may be coated or printed over the first side 103-1 of electrically conductive substrate 103 then treated to form surface layer 105. A few non-limiting examples of metal chalcogenide precursor compositions include sulfide- or selenide-sols, and sulfur- or selenide-containing organometallic compounds. Treating may further include a heating step.

In some embodiments as mentioned above, forming the metal chalcogenide may include a thermal treatment. Such treatment may include exposure to a temperature of at least 50° C., alternatively in a range of 50° C. to 150° C., alternatively in a range of 150° C. to 250° C., alternatively in a range of 250° C. to 350° C., alternatively in a range of 350° C. to 450° C., or any combination of these ranges. Thermal treatment time depends on many factors, but may optionally be at least 0.1 minute, alternatively in a range of 1 to 240 minutes, to form the desired surface layer. In some embodiments, thermal treatment may be carried out using an oven, a tube furnace, infrared heating elements, contact with a hot plate or exposure to a flash lamp. In some embodiments, treatment may include exposure to reduced pressure to form the metal chalcogenide, e.g., to drive off solvents or volatile reaction products. The reduced pressure may be less than 100 Torr, alternatively in a range of 0.1 to 100 Torr. Exposure time to the reduced pressure may optionally be at least 0.1 minute, alternatively in a range of 1 to 240 minutes. In some embodiments, both reduced pressure and thermal treatment may be used. In some embodiments, the reduced pressure or thermal treatment may initiate chemical reactions, drive off solvents, or remove reaction byproducts.

Lithium Storage Layer

The lithium storage layer includes a material capable of reversibly incorporating lithium. A lithium storage layer may be porous. In some embodiments, a lithium storage layer may include silicon, germanium, tin, antimony, or a combination thereof. In some embodiments, a lithium storage layer is substantially amorphous. In some embodiments a lithium storage layer includes substantially amorphous silicon. Such substantially amorphous storage layers may include a small amount (e.g., less than 20 atomic %) of crystalline material dispersed therein. A lithium storage layer may include dopants such as hydrogen, boron, phosphorous, sulfur, fluorine, aluminum, gallium, indium, arsenic, antimony, bismuth, nitrogen, or metallic elements. In some embodiments a lithium storage layer may include porous substantially amorphous hydrogenated silicon (a-Si:H), having, e.g., a hydrogen content of from 0.1 to 20 atomic %, or alternatively higher. In some embodiments, a lithium storage layer may include methylated amorphous silicon. Note that, unless referring specifically to hydrogen content, any atomic % metric used herein for a lithium storage material or layer refers to all atoms other than hydrogen.

In some embodiments, a lithium storage layer includes at least 40 atomic % silicon, germanium or a combination thereof, alternatively at least 50 atomic %, alternatively at least 60 atomic %, alternatively at least 70 atomic %, alternatively, at least 80 atomic %, alternatively at least 90 atomic %. In some embodiments, a lithium storage layer includes at least 40 atomic % silicon, alternatively at least 50 atomic %, alternatively at least 60 atomic %, alternatively at least 70 atomic %, alternatively, at least 80 atomic %, alternatively at least 90 atomic %.

In some embodiments, a lithium storage layer includes less than 10 atomic % carbon, alternatively less than 5 atomic %, alternatively less than 2 atomic %, alternatively less than 1 atomic %. In some embodiments, a lithium storage layer includes less than 5% by weight of carbon-based binders, graphitic carbon, graphene, graphene oxide, reduced graphene oxide, carbon nanotubes, carbon black, and conductive carbon.

In some embodiments, a lithium storage layer may be a porous lithium storage layer that includes voids or interstices (pores), which may be random or non-uniform with respect to size, shape and distribution. Such porosity does not result in, or result from, the formation of any recognizable nanostructures such as nanowires, nanopillars, nanotubes, nanochannels or the like. In some embodiments, the pores are polydisperse. In some embodiments, when analyzed by SEM cross section, 90% of pores larger than 100 nm in any dimension are smaller than about 5 μm in any dimension, alternatively smaller than about 3 μm, alternatively smaller than about 2 μm. In some embodiments, the lithium storage layer may include some pores that are smaller than 100 nm in any dimension, alternatively smaller than 50 nm in any dimension, alternatively smaller than 20 nm in any dimension. In some embodiments the lithium storage layer has an average density in a range of 1.0-1.1 g/cm$^3$, alternatively 1.1-1.2 g/cm$^3$, alternatively 1.2-1.3 g/cm$^3$, alternatively 1.3-1.4 g/cm$^3$, alternatively 1.4-1.5 g/cm$^3$, alternatively 1.5-1.6 g/cm$^3$, alternatively 1.6-1.7 g/cm$^3$, alternatively 1.7-1.8 g/cm$^3$, alternatively 1.8-1.9 g/cm$^3$, alternatively 1.9-2.0 g/cm$^3$, alternatively 2.0-2.1 g/cm$^3$, alternatively 2.1-2.2 g/cm$^3$, alternatively 2.2-2.25 g/cm$^3$, or any combination of contiguous ranges thereof, and includes at least 40 atomic % silicon, alternatively at least 50 atomic % silicon, alternatively at least 60 atomic % silicon, alternatively at least 70 atomic % silicon, alternatively 80 atomic % silicon, alternatively at least 90 atomic % silicon, alternatively at least 95 atomic % silicon.

In some embodiments, the lithium storage layer may be a continuous lithium storage layer. In some embodiments, the lithium storage layer may be both continuous and porous (a continuous porous lithium storage layer). The majority of active material (e.g., silicon, germanium, tin, antimony, or alloys thereof) of a continuous lithium storage layer has substantial lateral connectivity across portions of the current collector, such connectivity extending around random pores and interstices (in the case of a continuous porous lithium storage layer). Referring again to FIG. 1, in some embodiments, "substantial lateral connectivity" means that active material at one point X in the continuous lithium storage layer 107 may be connected to active material at a second point X' in the layer at a straight-line lateral distance LD that is at least as great as the thickness T of the continuous lithium storage layer, alternatively, a lateral distance at least 2 times as great as the thickness, alternatively, a lateral distance at least 3 times as great as the thickness. Not shown, the total path distance of material connectivity, including circumventing pores in the case of a continuous porous lithium storage layer, may be longer than LD. In some embodiments, the continuous lithium storage layer may be described as a matrix of interconnected silicon, germanium, or alloys thereof, and in the case of a continuous porous lithium storage layer, with random pores and interstices embedded therein. In some embodiments, the continuous porous lithium storage layer has a sponge-like form. In some embodiments, about 75% or more of the surface layer surface is contiguous with the first lithium storage layer, at least prior to electrochemical formation. It should be noted that a continuous lithium storage layer does not necessarily extend across the entire anode without any lateral breaks and may include random discontinuities or cracks and still be considered continuous.

The thickness or mass per unit area of the lithium storage layer (optionally continuous and/or porous) depends on the storage material, desired charge capacity and other operational and lifetime considerations. Increasing the thickness typically provides more capacity. If the lithium storage layer becomes too thick, electrical resistance may increase and the stability may decrease. In some embodiments, the anode may be characterized as having an active silicon areal density of at least 0.5 mg/cm$^2$, alternatively at least 1.0 mg/cm$^2$, alternatively at least 1.5 mg/cm$^2$, alternatively at least 3 mg/cm$^2$, alternatively at least 5 mg/cm$^2$. In some embodiments, the lithium storage structure may be characterized as having an active silicon areal density in a range of 0.5-1.5 mg/cm$^2$, alternatively 1.5-2 mg/cm$^2$, alternatively in a range of 2-3 mg/cm$^2$, alternatively in a range of 3-5 mg/cm$^2$, alternatively in a range of 5-10 mg/cm$^2$, alternatively in a range of 10-15 mg/cm$^2$, alternatively in a range of 15-20 mg/cm$^2$, or any combination of contiguous ranges thereof. "Active areal silicon density" refers to the silicon in electrical communication with the current collector that is available for reversible lithium storage at the beginning of cell cycling, e.g., after anode "electrochemical formation" discussed later. "Areal" of this term refers to the surface area of the electrically conductive substrate over which active silicon is provided. In some embodiments, not all of the silicon content is active silicon, i.e., some may be tied up in the form of non-active silicides or electrically isolated from the current collector.

In some embodiments the lithium storage layer has an average thickness of at least 0.5 μm, alternatively at least 1 μm, alternatively at least 3 μm, alternatively at least 7 μm. In some embodiments, the lithium storage layer (optionally continuous and/or porous) has an average thickness in a range of about 0.5 μm to about 50 μm. In some embodiments, the lithium storage layer (optionally continuous and/or porous) comprises at least 85 atomic % amorphous silicon and has a thickness in a range of 0.5 to 1 μm, alternatively 1-2 μm, alternatively 2-4 μm, alternatively 4-7 μm, alternatively 7-10 μm, alternatively 10-15 μm, alternatively 15-20 μm, alternatively 20-25 μm, alternatively 25-30 μm, alternatively 30-40 μm, alternatively 40-50 μm, or any combination of contiguous ranges thereof.

In some embodiments, the lithium storage layer (optionally continuous and/or porous) includes silicon but does not contain a substantial amount of crystalline silicides, i.e., the presence of silicides is not readily detected by X-Ray Diffraction (XRD). Metal silicides, e.g., nickel silicide, commonly form when silicon is deposited at higher temperatures directly onto metal, e.g., nickel foil. Metal silicides such as nickel silicides often have much lower lithium storage capacity than silicon itself. In some embodiments, the average atomic % of silicide-forming metallic elements within the lithium storage layer are on average less than 35%, alternatively less than 20%, alternatively less than 10%, alternatively less than 5%. In some embodiments, the average atomic % of silicide-forming metallic elements within the lithium storage layer are in a range of about 0.01% to about 10%, alternatively about 0.05 to about 5%. In some embodiments, the atomic % of silicide forming metallic elements in the lithium storage layer is higher nearer the current collector than away from the current collector.

In some embodiments, the lithium storage layer, optionally a continuous and/or porous lithium storage layer, includes a sub-stoichiometric oxide of silicon ($SiO_x$), germanium ($GeO_x$) or tin ($SnO_x$) wherein the ratio of oxygen atoms to silicon, germanium or tin atoms is less than 2:1, i.e., x<2, alternatively less than 1:1, i.e., x<1. In some embodiments, x is in a range of 0.02 to 0.95, alternatively 0.02 to 0.10, alternatively 0.10 to 0.50, or alternatively 0.50 to 0.95, alternatively 0.95 to 1.25, alternatively 1.25 to 1.50.

In some embodiments, the lithium storage layer, optionally a continuous and/or porous lithium storage layer, includes a sub-stoichiometric nitride of silicon ($SiN_y$), germanium ($GeN_y$), or tin ($SnN_y$) wherein the ratio of nitrogen atoms to silicon, germanium or tin atoms is less than 1.25:1, i.e., y<1.25. In some embodiments, y is in a range of 0.02 to 0.95, alternatively 0.02 to 0.10, alternatively 0.10 to 0.50, or alternatively 0.50 to 0.95, alternatively 0.95 to 1.25.

In some embodiments, the lithium storage layer, optionally a continuous and/or porous lithium storage layer, includes a sub-stoichiometric oxynitride of silicon ($SiO_xN_y$), germanium ($GeO_xN_y$), or tin ($SnO_xN_y$) wherein the ratio of total oxygen and nitrogen atoms to silicon, germanium or tin atoms is less than 1:1, i.e., (x+y)<1. In some embodiments, (x+y) is in a range of 0.02 to 0.95, alternatively 0.02 to 0.10, alternatively 0.10 to 0.50, or alternatively 0.50 to 0.95.

In some embodiments, the above sub-stoichiometric oxides, nitrides, or oxynitrides may be provided by a CVD process, including, but not limited to, a PECVD process. The oxygen and nitrogen may be provided uniformly within the lithium storage layer, or alternatively the oxygen or nitrogen content may be varied as a function of storage layer thickness.

In some embodiments, the lithium storage layer may include two or more sublayers, optionally continuous and/or porous lithium storage sublayers having different physical properties or chemical compositions, and independently selected from any of the embodiments discussed above.

Lithium Storage Filamentary Structures

Figure 4:
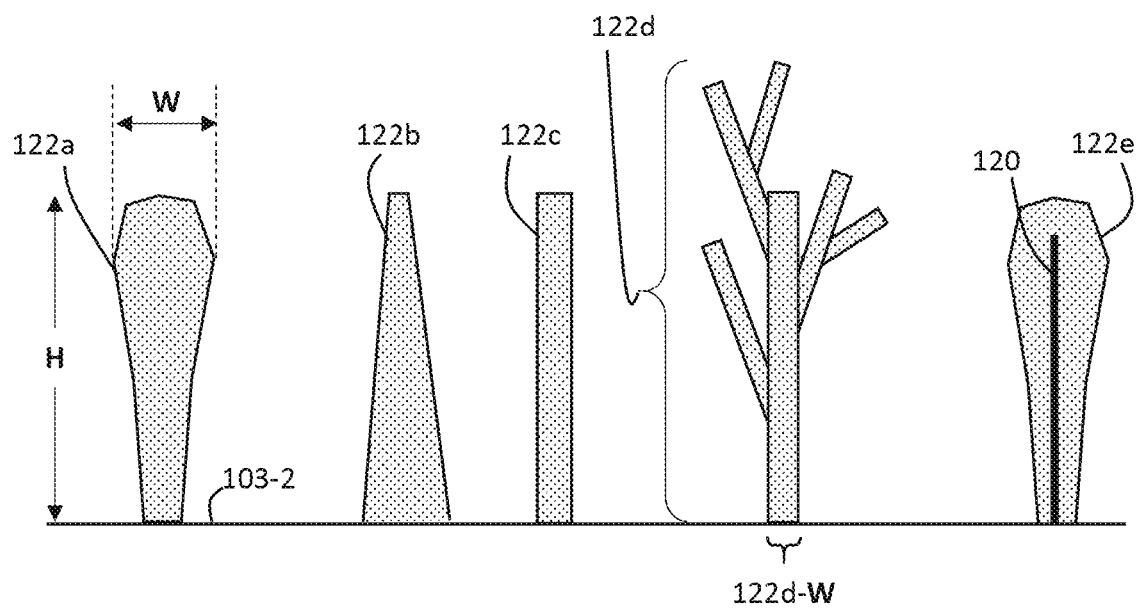
FIG. 4 is a cross-sectional view of lithium storage filamentary structures according to some embodiments of the present disclosure.

In some embodiments, lithium storage filamentary structures 122 are formed in contact with the second side 103-2 of the electrically conductive substrate 103. In some embodiments, the lithium storage filamentary structures include a material capable of reversibly incorporating lithium. In some embodiments, the lithium storage filamentary structures may include a porous material. In some embodiments, the lithium storage filamentary structures may include silicon, germanium, tin, antimony, or a combination thereof. In some embodiments, the lithium storage layer may exclude any of these elements or combination of these elements. In some embodiments, the lithium storage filamentary structures 122 may include lithium storage nanowires or nanopillars. In some embodiments, the lithium storage filamentary structures may have an aspect ratio of at least 2. As shown in FIG. 4, the aspect ratio of a lithium storage filamentary structure refers to the ratio of its maximum height H to its maximum width W. The maximum height refers to how far the filament extends from the second side 103-2 of the electrically conductive substrate, regardless of the current collector orientation. The maximum width is measured generally orthogonal to the axis of the lithium storage filamentary structure. The axis may be the longitudinal axis of the lithium storage filamentary structure or a branch or trunk of the lithium storage filamentary structure. The axis may be an axis about which the lithium storage filamentary structure is substantially symmetrical. In some embodiments, the maximum width may be the width of a cross-sectional slice of the lithium storage filamentary structure, where the cross-sectional slice has the minimum area for a slice going through a given point of the lithium storage filamentary structure. In some embodiments, the maximum width may be measured in a direction parallel to the second side 103-2.

The lithium storage filamentary structures may take on a variety of shapes. The width of the lithium storage filamentary structure may vary as a function of filament height. As shown in FIG. 4, in some embodiments, lithium storage filamentary structures 122a may have a bulbous end away from second side 103-2 of the electrically conductive substrate. The bulbous end has a width W that is greater than a width closer to or at the second side 103-2. In some embodiments, lithium storage filamentary structures 122b may be wider near the second side 103-2 of the electrically conductive substrate. In some embodiments, lithium storage filamentary structures 122c may have a uniform width as a function of filament height or as a function of the length of the filament from its point of attachment to second side 103-2. In some embodiments, lithium storage filamentary structures 122d may be branched, wherein maximum width 122d-W is measured across the widest trunk (as in this case) or branch. In some embodiments, lithium storage filamentary structures 122e may include a core filament 120, e.g., a metal or silicide nanowire, that may be more electrically conductive than surrounding lithium storage material making up the lithium storage filamentary structure.

The core filament may be characterized as having a width that may be measured in a plane parallel to the maximum width of the lithium storage filamentary structures. In some embodiments when the core filament includes a metal silicide, the boundary of the core filament may be when the atomic concentration of metal falls to below 50% of the atomic concentration at the center of the core filament, alternatively below 20%, or alternatively below 10%. In some embodiments, the core filament may have a maximum width that is less than 50% of the maximum width of the lithium storage filamentary structure, alternatively less than 20%, alternatively less than 10%, alternatively less than 5%. In some embodiments, the core filament may have a height that is less than 99% of the height of the lithium storage filamentary structure, alternatively less than 90%, alternatively less than 70%, alternatively less than 50%. Although not shown in FIG. 4, any of the other structures 122a, 122b, 122c, or 122d may optionally include a core filament.

In some embodiments, at least some of the lithium storage filamentary structures may have an aspect ratio of at least 2 (defined above), alternatively at least 3, alternatively at least 4, alternatively at least 5, alternatively at least 7, alternatively at least 10. In some embodiments, the majority of the lithium storage filamentary structures have an aspect ratio in a range of 3 to 5, alternatively in a range of 5 to 10, alternatively in a range of 10 to 20, alternatively in a range of 20 to 50, alternatively in a range of 50 to 100, or any combination of contiguous ranges thereof. The aspect ratio described herein may represent the mean average, median, or mode of the lithium storage filamentary structures. In addition, the aspect ratios may describe a percentage of the lithium storage filamentary structures, including at least 50%, 60%, 70%, 80%, 90%, 95%, 99%, or 100% of the lithium storage filamentary structures.

In some embodiments, at least some of the lithium storage filamentary structures have a height of at least 0.2 µm, alternatively 0.5 µm, alternatively at least 1.0 µm, alternatively at least 3 µm, alternatively at least 5 µm, alternatively at least 10 µm. In some embodiments, at least some of the lithium storage filamentary structures have a height of less than 500 µm, alternatively less than 250 µm, alternatively less than 100 µm, alternatively less than 75 µm, alternatively less than 50 µm, alternatively less than 25 µm, alternatively less than 20 µm, alternatively less than 15 µm, alternatively less than 10 µm, alternatively less than 7 µm. In some embodiments, the lithium storage filamentary structures collectively have an average height in a range of 0.2 µm to 0.5 µm, alternatively in a range of 0.5 µm to 1 µm, alternatively in a range of 1 µm to 2 µm, alternatively in a range of 2 µm to 5 µm, alternatively in a range of 5 µm to 10 µm, alternatively in a range of 10 µm to 20 µm, alternatively in a range of 20 µm to 50 µm, alternatively in a range of 50 µm to 100 µm, or any combination of contiguous ranges thereof. The height described herein may represent the mean average, median, or mode of the lithium storage filamentary structures. In addition, the heights may describe a percentage of the lithium storage filamentary structures, including at least 50%, 60%, 70%, 80%, 90%, 95%, 99%, or 100% of the lithium storage filamentary structures.

In some embodiments, at least some of the lithium storage filamentary structures have a maximum width of at least 0.01 µm, alternatively 0.02 µm, alternatively at least 0.05 µm, alternatively at least 0.1 µm, alternatively at least 0.25 µm, alternatively at least 0.5 µm, alternatively at least 1 µm, alternatively at least 2 µm, alternatively at least 3 µm, alternatively at least 5 µm, alternatively at least 10 µm, alternatively at least 20 µm, alternatively at least 50 µm. In some embodiments, at least some of the lithium storage filamentary structures have a maximum width of less than 50 µm, alternatively less than 20 µm, alternatively less than 10 µm, alternatively less than 7 µm, alternatively less than 5 µm, alternatively less than 4 µm, alternatively less than 3 µm, alternatively less than 2 µm, alternatively less than 1 µm, alternatively less than 0.1 µm. In some embodiments, the lithium storage filamentary structures collectively have a maximum width in a range of 0.01 µm to 0.02 µm, alternatively in a range of 0.02 µm to 0.05 µm, alternatively in a range of 0.05 µm to 0.1 µm, alternatively in a range of 0.1 µm to 0.2 µm, alternatively in a range of 0.2 µm to 0.5 µm, alternatively in a range of 0.5 µm to 1 µm, alternatively in a range of 1 µm to 2 µm, alternatively in a range of 2 µm to 5 µm, alternatively in a range of 5 µm to 10 µm, alternatively in a range of 10 µm to 20 µm, or any combination of contiguous ranges thereof. The widths described herein may represent the mean average, median, or mode of the lithium storage filamentary structures. In addition, the widths may describe a percentage of the lithium storage filamentary structures, including at least 50%, 60%, 70%, 80%, 90%, 95%, 99%, or 100% of the lithium storage filamentary structures.

In some embodiments, the lithium storage filamentary structures are bulbous lithium storage filamentary structures (for example, those like 122a of FIG. 4) and tightly packed, i.e., spaced very close to one another and often in contact. In some embodiments, at least 50%, alternatively at least 70%, alternatively at least 80%, alternatively at least 90%, alternatively substantially all of bulbous lithium storage filamentary structures are in contact with at least one other bulbous lithium storage filamentary structures, alternatively at least two other bulbous lithium storage structures. In some embodiments, tightly packed bulbous lithium storage filamentary structures may be characterized as having a total reflectance of at least 10% measured at 550 nm, alternatively at least 15%, or alternatively at least 20%.

In some embodiments, lithium storage filamentary structures are not tightly packed and may be characterized as having a total reflectance of at less than 10% measured at 550 nm, alternatively less than 8%.

In some embodiments, the lithium storage filamentary structures include silicon, germanium, antimony, tin, or a combination thereof. In some embodiments, the lithium storage filamentary structures include a transition metal silicide or a transition metal alloy of germanium. In some embodiments the lithium storage filamentary structures have a total content of silicon, germanium, or a combination thereof, of at least 30 atomic %, alternatively, at least 40%, alternatively at least 50%, alternatively at least 60%, alternatively at least 70%, alternatively at least 80%, alternatively at least 90%, alternatively at least 95%. Note that, unless referring specifically to hydrogen content, any atomic % metric used herein for a lithium storage filamentary structures refers to all atoms other than hydrogen.

Methods of growing lithium storage filaments may include, but are not limited to, CVD and PECVD methods described in U.S. Pat. Nos. 9,325,014 and 8,257,866, the entire contents of which are incorporated by reference for all purposes.

In some embodiments, the second side 103-2 of the electrically conductive substrate 103 includes a filament growth catalyst material. A filament growth catalyst material assists in initiating and growing the filament. For the purposes of this disclosure, filament growth catalyst materials include "true" catalytic materials that remain active indefinitely, and materials that may eventually be consumed during filament growth. In some embodiments the filament growth catalyst material may be a vapor-liquid-solid (VLS) filament growth catalyst material. In some embodiments the filament growth catalyst material may be provided as a substantially continuous layer that corresponds to the second side 103-2 of electrically conductive substrate 103. In some embodiments, the second side 103-2 of electrically conductive substrate 103 may include a pattern of filament growth catalyst material where the pattern may be random or predetermined. In some embodiments the electrically conductive substrate may be a metal foil that is itself a filament growth catalyst material, and the second side 103-2 of electrically conductive substrate 103 may simply be a clean surface of the foil. Non-limiting examples of catalyst materials may include non-refractory transition metals and their alloys. The catalyst material may include, for example, nickel, gold, palladium, platinum, ruthenium, aluminum, indium, gallium, tin, or iron, or their alloys.

Figure 5A:
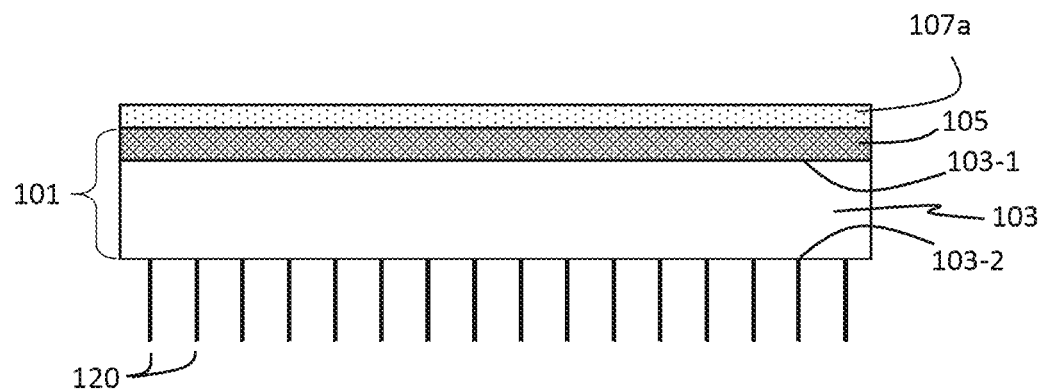
FIG. 5A is a cross-sectional view of a current collector having core filaments according to some embodiments of the present disclosure.

Referring to FIG. 5A, in some embodiments, growing lithium storage filamentary structures may include growing a plurality of core filaments 120 on the second side of the electrically conductive substrate. In some embodiments this is done by VLS method whereby the current collector is exposed to a filament precursor gas under elevated temperatures. The temperature depends on the catalyst and filament precursor gas, but in some embodiments may be at least 300° C., alternatively at least 400° C., alternatively from 300° C. to 400° C., alternatively at least from 400° C. to 500° C., alternatively, at least from 500° C. to 600° C., or alternatively at least 600° C. In some embodiments, the filament precursor gas is a silicon-containing gas such as silane or a germanium-containing gas such as germane, but alternative silicon- and germanium-containing gases may be used. In some embodiments, the filaments include a silicide or germanium alloy. In some embodiments, conditions for growing the core filaments may also deposit a lithium storage layer 107a comprising silicon or germanium or both. The core filaments may be electrically conductive or semi-conductive. In some embodiments the filament growth catalyst material may include nickel and the filaments include nickel silicide. In some embodiments, the filament growth catalyst material may be consumed during formation of the filaments.

Figure 5B:
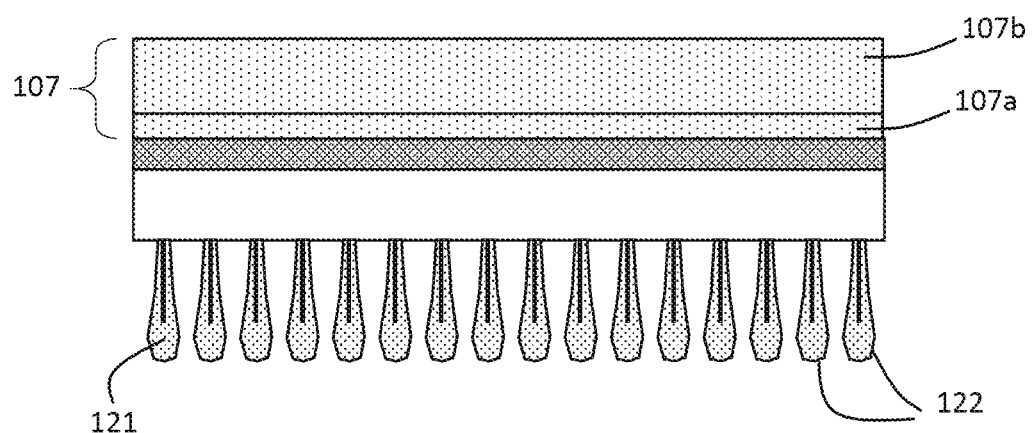
FIG. 5B is a cross-sectional view of an anode according to some embodiments of the present disclosure.

As shown in FIG. 5B, in some embodiments, a plurality of lithium storage filamentary structures 122 may be formed by depositing a lithium storage coating 121 over the core filament 120. Lithium storage coating 121 may have a different chemical composition than core filament 120. In some embodiments, the lithium storage coating may include silicon, germanium, tin, or a combination thereof. In some embodiments, the lithium storage filamentary structures are formed at least in part by a CVD (chemical vapor deposition) process, such as Thermal CVD, HWCVD (hot-wire CVD), and/or PECVD (plasma enhanced chemical vapor deposition). In some embodiments, core filaments 120 may be grown by a thermal CVD process and lithium storage coating 121 may be deposited by HWCVD or PECVD. The vapor deposition process may include a lithium storage precursor gas that contains silicon (e.g., silane), germanium (e.g., germane), or tin (e.g., Sn(IV) tert-butoxide). In some embodiments, core filaments 120 may be grown in a separate step or chamber than lithium storage coating 121 deposition. In some embodiments, core filaments 120 may be grown in the same chamber as used for depositing lithium storage coating 121. In some embodiments, the growth of core filaments and formation of lithium storage filamentary structures 122 may be performed in a common step without substantially changing conditions, e.g., by using a catalyst that is consumed, such that core filament formation stops and deposition of lithium storage coating 121 begins. That is, the core filament formation may be self-limiting. Alternatively, conditions are altered after core filament growth (temperature, precursor gas, gas pressure, plasma power, deposition angle, or the like) to promote deposition of lithium storage coating 121 and formation of the lithium storage filamentary structures 122. In some embodiments, the core filamentary structures may include a metal silicide core filament 120 (e.g. a nickel silicide) and a silicon-containing lithium storage coating 121 that may also contain some of the metal but at a lower atomic % than the core filament. That is, the lithium storage coating 121 may have a higher atomic % silicon than the core filament 120. As shown in FIG. 4B, in some embodiments, conditions for depositing lithium storage coating 121, may also deposit lithium storage layer 107b on the opposite side, thereby forming a lithium storage layer 107 having sublayers 107a and 107b.

In some embodiments, the second side 103-2 of the electrically conductive substrate 103 may include silicon-containing lithium storage filamentary structures and have a total silicon content of at least 1 mg/cm$^2$, alternatively at least 2 mg/cm$^2$, alternatively at least 3 mg/cm$^2$, alternatively at least 10 mg/cm$^2$, alternatively at least 15 mg/cm$^2$. In some embodiments, the second side 103-2 of the electrically conductive substrate 103 may include silicon-containing lithium storage filamentary structures and have an active areal silicon density in a range of 1-2 mg/cm$^2$, alternatively in a range of 2-3 mg/cm$^2$, alternatively in a range of 3-5 mg/cm$^2$, alternatively in a range of 5-10 mg/cm$^2$, alternatively in a range of 10-15 mg/cm$^2$, alternatively in a range of 15-20 mg/cm$^2$, alternatively in a range of 20-30 mg/cm$^2$, alternatively in a range of 30-40 mg/cm$^2$, alternatively in a range of 40-50 mg/cm$^2$, or any combination of contiguous ranges thereof. In some embodiments, not all of the silicon content is available for lithium storage and may be tied up in the form of silicides.

CVD

CVD generally involves flowing a precursor gas, a gasified liquid in terms of direct liquid injection CVD or gases and liquids into a chamber containing one or more objects, typically heated, to be coated. Chemical reactions occur on and near the hot surfaces, resulting in the deposition of a thin film on the surface. This is accompanied by the production of chemical by-products that are exhausted out of the chamber along with unreacted precursor gases. As would be expected with the large variety of materials deposited and the wide range of applications, there are many variants of CVD that may be used to form the lithium storage layer, the lithium storage filamentary structures, the surface layer, a supplemental layer (see below) or other layer. It may be done in hot-wall reactors or cold-wall reactors, at sub-torr total pressures to above-atmospheric pressures, with and without carrier gases, and at temperatures typically ranging from 100-1600° C. in some embodiments. There are also a variety of enhanced CVD processes, which involve the use of plasmas, ions, photons, lasers, hot filaments, or combustion reactions to increase deposition rates and/or lower deposition temperatures.

As mentioned, the lithium storage layer or lithium storage filamentary structures, e.g., containing silicon, germanium, tin, or a combination, may be provided by plasma-enhanced chemical vapor deposition (PECVD). Relative to conventional CVD, deposition by PECVD can often be done at lower temperatures and higher rates, which can be advantageous for higher manufacturing throughput. In some embodiments, the PECVD may be used to deposit a substantially amorphous silicon material (optionally doped). In some embodiments, PECVD is used to deposit a substantially amorphous continuous porous silicon layer over the surface layer.

PECVD

In PECVD processes, according to various implementations, a plasma may be generated in a chamber in which the substrate is disposed or upstream of the chamber and fed into the chamber. Various types of plasmas may be used including, but not limited to, capacitively-coupled plasmas, inductively-coupled plasmas, and conductive coupled plasmas. Any appropriate plasma source may be used, including DC, AC, RF, VHF, combinatorial PECVD and microwave sources may be used. Some non-limiting examples of useful PECVD tools include hollow cathode tube PECVD, magnetron confined PECVD, inductively coupled plasma chemical vapor deposition (ICP-PECVD, sometimes called HDPECVD, ICP-CVD or HDCVD), and expanding thermal plasma chemical vapor deposition (ETP-PECVD).

PECVD process conditions (temperatures, pressures, precursor gases, carrier gasses, dopant gases, flow rates, energies, and the like) can vary according to the particular process and tool used, as is well known in the art In some implementations, the PECVD process is an expanding thermal plasma chemical vapor deposition (ETP-PECVD) process. In such a process, a plasma generating gas is passed through a direct current arc plasma generator to form a plasma, with a web or other substrate including the current collector optionally in an adjoining vacuum chamber. A silicon source gas is injected into the plasma, with radicals generated. The plasma is expanded via a diverging nozzle and injected into the vacuum chamber and toward the substrate. An example of a plasma generating gas is argon (Ar). In some embodiments, the ionized argon species in the plasma collide with silicon source molecules to form radical species of the silicon source, resulting in deposition onto the current collector. Example ranges for voltages and currents for the DC plasma source are 60 to 80 volts and 40 to 70 amperes, respectively.

Any appropriate silicon source may be used to deposit silicon layers, including silane ($SiH_4$), dichlorosilane ($H_2SiCl_2$), monochlorosilane ($H_3SiCl$), trichlorosilane ($HSiCl_3$), silicon tetrachloride ($SiCl_4$), and diethylsilane to form the silicon layers. Depending on the gas used, the silicon layer may be formed by decomposition or reaction with another compound, such as by hydrogen reduction. Depending on the gas(es) used, the silicon layer may be formed by decomposition or reaction with another compound, such as by hydrogen reduction. In some embodiments, the gases may include a silicon source such as silane, a noble gas such as helium, argon, neon, or xenon, optionally one or more dopant gases, and substantially no hydrogen. In some embodiments, the gases may include argon, silane, and hydrogen, and optionally some dopant gases. In some embodiments the gas flow ratio of argon relative to the combined gas flows for silane and hydrogen is at least 3.0, alternatively at least 4.0. In some embodiments, the gas flow ratio of argon relative to the combined gas flows for silane and hydrogen is in a range of 3-5, alternatively 5-10, alternatively 10-15, alternatively 15-20, or any combination of contiguous ranges thereof. In some embodiments, the gas flow ratio of hydrogen gas to silane gas is in a range of 0-0.1, alternatively 0.1-0.2, alternatively 0.2-0.5, alternatively 0.5-1, alternatively 1-2, alternatively 2-5, or any combination of contiguous ranges thereof. In some embodiments, higher porosity silicon may be formed and/or the rate of silicon deposition may be increased when the gas flow ratio of silane relative to the combined gas flows of silane and hydrogen increases. In some embodiments a dopant gas is borane or phosphine, which may be optionally mixed with a carrier gas. In some embodiments, the gas flow ratio of dopant gas (e.g., borane or phosphine) to silicon source gas (e.g., silane) is in a range of 0.0001-0.0002, alternatively 0.0002-0.0005, alternatively 0.0005-0.001, alternatively 0.001-0.002, alternatively 0.002-0.005, alternatively 0.005-0.01, alternatively 0.01-0.02, alternatively 0.02-0.05, alternatively 0.05-0.10, or any combination of contiguous ranges thereof. Such gas flow ratios described above may refer to the relative gas flow, e.g., in standard cubic centimeter per minute (SCCM). In some embodiments, the PECVD deposition conditions and gases may be changed over the course of the deposition.

In some embodiments, the temperature at the current collector during at least a portion of the time of PECVD deposition is in a range of 100° C. to 200° C., alternatively 200° C. to 300° C., alternatively 300° C. to 400° C., alternatively 400° C. to 500° C., alternatively 500° C. to 600° C., alternatively 600° C. to 700° C. or any combination of contiguous ranges thereof. In some embodiments, the temperature may vary during the time of PECVD deposition. For example, the temperature during early times of the PECVD may be higher than at later times. Alternatively, the temperature during later times of the PECVD may be higher than at earlier times.

As mentioned, in some embodiments the lithium storage layer may be deposited using the same or different CVD process as used to form the lithium storage filamentary structures. A "CVD process" may refer to certain process conditions that are used to control the deposition, in particular, temperature, precursor material, gas flow rate, pressure, and plasma energy (if applicable). In some embodiments, the lithium storage layer may be deposited concurrently with formation of the lithium storage filamentary structures, or in separate steps, where either side may be deposited or formed prior to the other. If concurrently, the CVD tool, for example a PECVD tool, may be configured to deposit the desired lithium storage layer on the first side, and form the desired lithium storage filamentary structures on the second side. Concurrent deposition may use substantially the same CVD process conditions for both sides. In some embodiments, "substantially the same" may include when the two CVD process temperatures are within 20° C., the same precursors and carrier gases are used, the gas flow rates are within 20%, the chamber pressures are with 20%, and the applied plasma energies (if applicable) are within 20%. In some embodiments, even though concurrently deposited, the first side and second side CVD processes may be different, e.g., due to different localized gas flows, precursor gas mixtures, plasma energies or the like.

Other Anode Features

Figure 6:
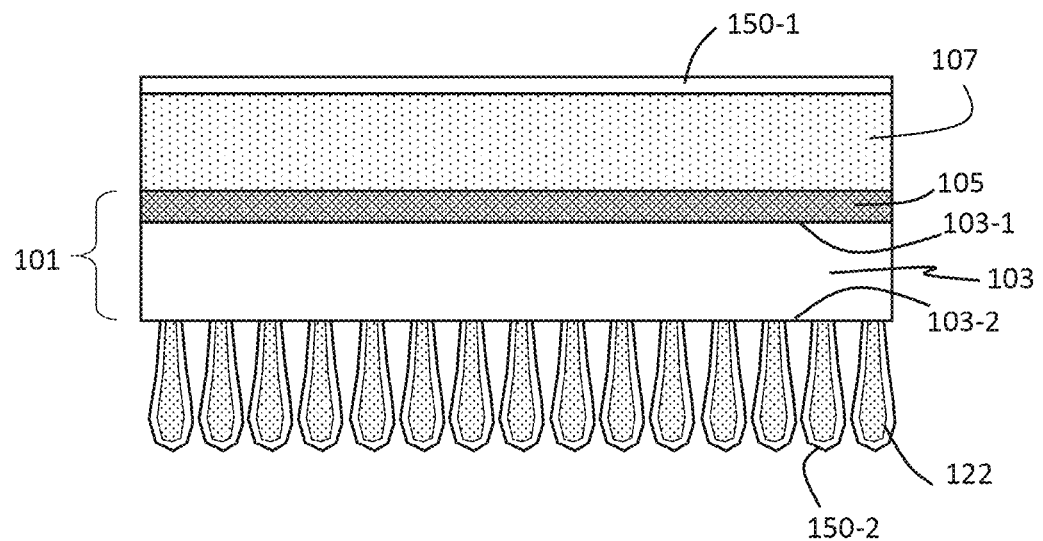
FIG. 6 is a cross-sectional view of an anode according to some embodiments of the present disclosure.

The anode may optionally include various additional layers and features. The current collector may include one or more features to ensure that a reliable electrical connection can be made. In some embodiments, a supplemental layer 150-1 may be provided over the surface of the lithium storage layer, as shown in FIG. 6. Alternatively, or in addition, a supplemental layer 150-2 may be provided over the lithium storage filamentary structures 122. In some embodiments, the supplemental layer may be a protection layer to enhance lifetime or physical durability. The supplemental layer may be an oxide formed from the lithium storage material itself, e.g., silicon dioxide or silicon nitride in the case of silicon. A supplemental layer may be deposited, for example, by ALD, CVD, PECVD, evaporation, sputtering, solution coating, ink jet, or any method that is compatible with the anode. In some embodiments, a supplemental layer is deposited in the same CVD or PECVD device as used to form the lithium storage layer or lithium storage filamentary structures. For example, a silicon dioxide or silicon nitride supplemental layer may be formed by introducing an oxygen- or nitrogen-containing gas along with the silicon precursor gas used to form the lithium storage layer or lithium storage filamentary structures. In some embodiments the supplemental layer may include boron nitride or silicon carbide. In some embodiments, a supplemental layer may include a metal compound as described below.

A supplemental layer should be reasonably conductive to lithium ions and permit lithium ions to move into and out of the lithium storage layer during charging and discharging. In some embodiments, the lithium ion conductivity of a supplemental layer is at least $10^{-9}$ S/cm, alternatively at least $10^{-8}$ S/cm, alternatively at least $10^{-7}$ S/cm, alternatively at least $10^{-6}$ S/cm. In some embodiments, the supplemental layer acts as a solid-state electrolyte. In some embodiments, the supplemental layer(s) are less electrically conductive than the lithium storage structure so that little or no electrochemical reduction of lithium ions to lithium metal occurs at the supplemental layer/electrolyte interface. In addition to providing protection from electrochemical reactions, a multiple supplemental layer structure may provide superior structural support. In some embodiments, although the supplemental layers may flex and may form fissures when the lithium storage layer expands during lithiation, crack propagation can be distributed between the layers to reduce direct exposure of the lithium storage structure to the bulk electrolyte. For example, a fissure in the second supplemental layer may not align with a fissure in the first supplemental layer. Such an advantage may not occur if just one thick supplemental layer is used. In an embodiment, the second supplemental layer may be formed of a material having higher flexibility than the first supplemental layer.

In some embodiments, a supplemental layer may include silicon nitride, e.g., substantially stoichiometric silicon nitride where the ratio of nitrogen to silicon is in a range of 1.33 to 1.25. A supplemental layer comprising silicon nitride may have an average thickness in a range of about 0.5 nm to 1 nm, alternatively 1 nm to 2 nm, alternatively 2 nm to 10 nm, alternatively 10 nm to 20 nm, alternatively 20 nm to 30 nm, alternatively 30 nm to 40 nm, alternatively 40 nm to 50 nm, or any combination of contiguous ranges thereof. Silicon nitride may be deposited by an atomic layer deposition (ALD) process or by a CVD process. In some embodiments, the lithium storage layer includes silicon deposited by some type of CVD process as described above, and at the end, a nitrogen gas source is added to the CVD deposition chamber along with the silicon source.

In some embodiments, a supplemental layer may include silicon dioxide, e.g., substantially stoichiometric silicon dioxide where the ratio of oxygen to silicon is in a range of 2.0 to 1.9. A supplemental layer comprising silicon dioxide may have an average thickness in a range of about 2 nm to 10 nm, alternatively 10 nm to 30 nm, alternatively 30 nm to 50 nm, alternatively 50 nm to 70 nm, alternatively 70 nm to 100 nm, alternatively 100 nm to 150 nm, alternatively 150 nm to 200 nm, or any combination of contiguous ranges thereof. Silicon dioxide may be deposited by an atomic layer deposition (ALD) process or by a CVD process. In some embodiments, the lithium storage layer includes silicon deposited by some type of CVD process as described above, and at the end, an oxygen-containing gas source is added to the CVD deposition chamber along with the silicon source.

In some embodiments, a supplemental layer may include silicon oxynitride, e.g., a substantially stoichiometric oxynitride of silicon ($SiO_xN_y$) wherein the sum of 0.5x and 0.75y is in a range of 1.00 to 0.95. A supplemental layer comprising silicon nitride may have an average thickness in a range of about 0.5 nm to 1 nm, alternatively 1 nm to 2 nm, alternatively 2 nm to 10 nm, alternatively 10 nm to 20 nm, alternatively 20 nm to 30 nm, alternatively 30 nm to 40 nm, alternatively 40 nm to 50 nm, alternatively 50 nm to 70 nm, alternatively 70 nm to 100 nm, alternatively 100 nm to 150 nm, or any combination of contiguous ranges thereof. In some embodiments, silicon oxynitride may be provided by a CVD process, including but not limited to, a PECVD process.

In some embodiments, silicon nitride, silicon dioxide, or silicon oxynitride may be deposited by an atomic layer deposition (ALD) process or by a CVD process. In some embodiments, the lithium storage layer includes silicon deposited by some type of CVD process as described above, and at the end, a nitrogen- and/or an oxygen-containing gas source is added to the CVD deposition chamber along with the silicon source.

In some embodiments a supplemental layer may include a metal compound. In some embodiments, the metal compound includes a metal oxide, metal nitride, or metal oxynitride, e.g., those containing aluminum, titanium, vanadium, zirconium, or tin, or mixtures thereof. In some embodiments, a supplemental layer including a metal oxide, metal nitride, or metal oxynitride, may have an average thickness of less than about 100 nm, for example, in a range of about 0.5 nm to about 1 nm, alternatively about 1 nm to about 2 nm, alternatively 2 nm to 10 nm, alternatively 10 nm to 20 nm, alternatively 20 nm to 30 nm, alternatively 30 nm to 40 nm, alternatively 40 nm to 50 nm, or any combination of contiguous ranges thereof. The metal oxide, metal nitride, or metal oxynitride may include other components or dopants such as transition metals, phosphorous or silicon.

In some embodiments, the metal compound may include a lithium-containing material such as lithium phosphorous oxynitride (LIPON), a lithium phosphate, a lithium aluminum oxide, or a lithium lanthanum titanate. In some embodiments, the thickness of supplemental layer including a lithium-containing material may be in a range of 0.5 nm to 200 nm, alternatively 1 nm to 10 nm, alternatively 10 nm to 20 nm, alternatively 20 nm to 30 nm, alternatively 30 nm to 40 nm, alternatively 40 nm to 50 nm, alternatively 50 nm to 100 nm, alternatively 100 to 200 nm, or any combination of contiguous ranges thereof.

In some embodiments the metal compound may be deposited by a process comprising ALD, thermal evaporation, sputtering, or e-beam evaporation. ALD is a thin-film deposition technique typically based on the sequential use of a gas phase chemical process. The majority of ALD reactions use at least two chemicals, typically referred to as precursors. These precursors react with the surface of a material one at a time in a sequential, self-limiting, manner. Through the repeated exposure to separate precursors, a thin film is deposited, often in a conformal manner. In addition to conventional ALD systems, so-called spatial ALD (SALD) methods and materials can be used, e.g., as described U.S. Pat. No. 7,413,982, the entire contents of which are incorporated by reference herein for all purposes. In certain embodiments, SALD can be performed under ambient conditions and pressures and have higher throughput than conventional ALD systems.

In some embodiments, the process for depositing the metal compound may include electroless deposition, contact with a solution, contact with a reactive gas, or electrochemical methods. In some embodiments, a metal compound may be formed by depositing a metallic layer (including but not limited to thermal evaporation, CVD, sputtering, e-beam evaporation, electrochemical deposition, or electroless deposition) followed by treatment to convert the metal to the metal compound (including but not limited to, contact with a reactive solution, contact with an oxidizing agent, contact with a reactive gas, or a thermal treatment).

The supplemental layer may include an inorganic-organic hybrid structure having alternating layers of metal oxide and bridging organic materials. These inorganic-organic hybrid structures are sometimes referred to as "metalcone". Such structures can be made using a combination of atomic layer deposition to apply the metal compound and molecular layer deposition (MLD) to apply the organic. The organic bridge is typically a molecule having multiple functional groups. One group can react with a layer comprising a metal compound and the other group is available to react in a subsequent ALD step to bind a new metal. There is a wide range of reactive organic functional groups that can be used including, but not limited to hydroxy, carboxylic acid, amines, acid chlorides and anhydrides. Almost any metal compound suitable for ALD deposition can be used. Some non-limiting examples include ALD compounds for aluminum (e.g., trimethyl aluminum), titanium (e.g., titanium tetrachloride), zinc (e.g., diethyl zinc), and zirconium (tris(dimethylamino)cyclopentadienyl zirconium). For the purposes of the present disclosure, this alternating sublayer structure of metal oxide/bridging organic is considered a single supplemental layer of metalcone. When the metal compound includes aluminum, such structures may be referred to as an alucone. Similarly, when the metal compound includes zirconium, such structures may be referred to as a zircone. Further examples of inorganic-organic hybrid structures that may be suitable as a supplemental layer may be found in U.S. Pat. No. 9,376,455, and US patent publications 2019/0044151 and 2015/0072119, the entire contents of which are incorporated herein by reference.

In some embodiments, a supplemental layer having a metalcone may have a thickness in a range of 0.5 nm to 200 nm, alternatively 1 nm to 10 nm, alternatively 10 nm to 20 nm, alternatively 20 nm to 30 nm, alternatively 30 nm to 40 nm, alternatively 40 nm to 50 nm, alternatively 50 nm to 100 nm, alternatively 100 to 200 nm, or any combination of contiguous ranges thereof.

In some embodiments a supplemental layer (a first, a second, or an additional supplemental layer) may include boron nitride or silicon carbide and may have an average thickness of less than about 100 nm, for example, in a range of about 0.5 nm to about 1 nm, alternatively about 1 nm to about 2 nm, alternatively 2 nm to 10 nm, alternatively 10 nm to 20 nm, alternatively 20 nm to 30 nm, alternatively 30 nm to 40 nm, alternatively 40 nm to 50 nm, or any combination of contiguous ranges thereof.

In some embodiments the anode is at least partially pre-lithiated, i.e., the lithium storage layer and/or the lithium storage filamentary structures include some lithium prior to battery assembly, that is, prior to combining the anode with a cathode in a battery cell. Note that a "lithiated storage layer" simply means that at least some of the potential storage capacity the lithium storage layer is filled, but not necessarily all. Similarly, "lithiated storage filamentary structures" simply means that at least some of the potential storage capacity the lithium storage filamentary structures is filled, but not necessarily all. In some embodiments, the lithiated storage layer may include lithium in a range of 1% to 10% of the theoretical lithium storage capacity of the lithium storage layer, alternatively 10% to 20%, alternatively, 20% to 30%, alternatively 30% to 40%, alternatively 40% to 50%, alternatively 50% to 60%, alternatively 60% to 70%, alternatively 70% to 80%, alternatively 80% to 90%, alternatively 90% to 100%, or any combination of contiguous ranges thereof. In some embodiments, the metal oxide material may capture some of the lithium, and one may need to account for such capture to achieve the desired lithium range in the lithiated storage layer. In some embodiments, the lithiated storage filamentary structures may include lithium in a range of 1% to 10% of the theoretical lithium storage capacity of the lithium storage filamentary structures, alternatively 10% to 20%, alternatively, 20% to 30%, alternatively 30% to 40%, alternatively 40% to 50%, alternatively 50% to 60%, alternatively 60% to 70%, alternatively 70% to 80%, alternatively 80% to 90%, alternatively 90% to 100%, or any combination of contiguous ranges thereof.

In some embodiments prelithiation may include depositing lithium metal over the lithium storage layer and/or over the lithium storage filamentary structures, e.g., by evaporation, e-beam or sputtering. Alternatively, prelithiation may include contacting the anode with a reductive lithium organic compound, e.g., lithium naphthalene, n-butyllithium or the like. In some embodiments, prelithiation may include incorporating lithium by electrochemical reduction of lithium ion in prelithiation solution.

In some embodiments, prelithiation includes physical contact of the lithium storage layer and/or the lithium storage filamentary structures with a lithiation material. The lithiation material may include a reducing lithium compound, lithium metal or a stabilized lithium metal powder, any of which may optionally be provided as a coating on a lithium transfer substrate. The lithium transfer substrate may include a metal (e.g., as a foil), a polymer, a ceramic, or some combination of such materials, optionally in a multi-layer format. In some embodiments, such lithiation material may be provided on at least one side of a current separator that faces the anode, i.e., the current separator also acts as a lithium transfer substrate. Stabilized lithium metal powders ("SLMP") typically have a phosphate, carbonate or other coating over the lithium metal particles, e.g. as described in U.S. Pat. Nos. 8,377,236, 6,911,280, 5,567,474, 5,776,369, and 5,976,403, the entire contents of which are incorporated herein by reference. In some embodiments SLMPs may require physical pressure to break the coating and allow incorporation of the lithium into the lithium storage layer and/or the lithium storage filamentary structures. In some embodiments, other lithiation materials may be applied with pressure and/or heat to promote lithium transfer into the lithium storage layer, optionally through one or more supplemental layers. In some embodiments a pressure applied between an anode and a lithiation material may be at least 200 kPa, alternatively at least 1000 kPa, alternatively at least 5000 kPa. Pressure may be applied, for example, by calendering, pressurized plates, or in the case of a lithiation material coating on a current separator, by assembly into battery having confinement or other pressurizing features.

In some embodiments, prelithiation includes thermally treating the lithium storage layer and/or the lithium storage filamentary structures during lithium incorporation, after lithium incorporation, or both during and after. The thermal treatment may assist in the incorporation of the lithium, for example by promoting lithium diffusion. In some embodiments, thermally treating includes exposing the anode to a temperature in a range of 50° C. to 100° C., alternatively 100° C. to 150° C., alternatively 150° C. to 200° C., alternatively 200° C. to 250° C., alternatively 250° C. to 300° C., or alternatively 300° C. to 350° C. In some embodiments, thermal treatment may be done under controlled atmosphere, e.g., under vacuum or argon atmosphere to avoid unwanted reactions with oxygen, nitrogen, water or other reactive gases.

Figure 7:
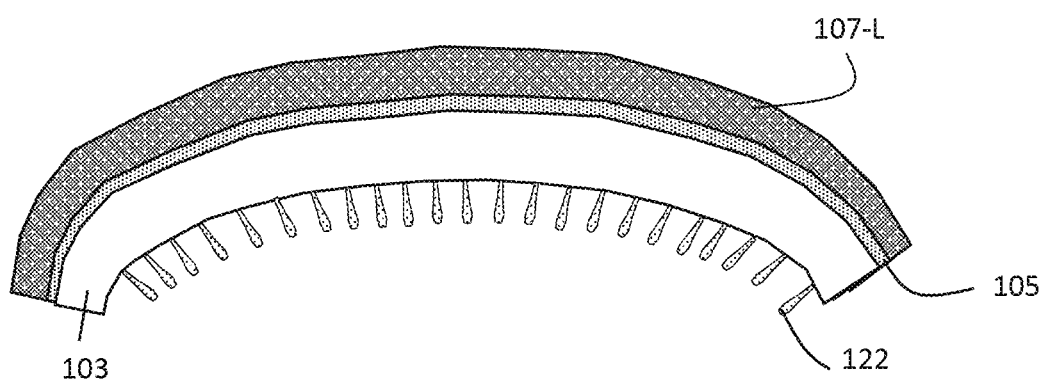
FIG. 7 is a cross-sectional view of an anode according to some embodiments of the present disclosure.

In some embodiments, prelithiation may soften the lithium storage layer and/or the lithium storage filamentary structures, for example, due to the formation of a lithium-silicon alloy. This softening may cause problems in some processes, for example, roll-to-roll processes whereby the softened lithium storage layer and/or the lithium storage filamentary structures begin to stick to rollers or to itself during winding. In some embodiments, by providing one or more supplemental layers prior to prelithiation, or by providing a lithium-ion conducting layer after prelithiation, the structural integrity and processability of the anode may be substantially improved. In some embodiments, the supplemental layer(s) may act as a harder interface with other surfaces to prevent or reduce contact of such surfaces with the softened lithium storage In some embodiments, only the lithium storage layer side of the anode is prelithiated. Prelithiation is expected to cause silicon-containing lithium storage layer to expand. In some embodiments, the expansion may induce stress on the lithium storage layer. As shown in FIG. 7, such stress in the lithiated storage layer 107-L may be readily released by allowing the anode to bend. Such bending may create stress on the second side of the electrically conductive substrate, but the discontinuous nature of the lithium storage filamentary structures on the second side may readily absorb this stress better than if a second lithium storage layer was instead provided on the second side. In some embodiments, the lithium storage filamentary structures are also prelithiated to form lithiated filamentary structures. In some embodiments, even in the lithiated state, the second side may still readily absorb possible stresses from the lithiated storage layer 107-L. In some embodiments, an anode where at least the lithium storage layer is prelithiated, and optionally also having the lithium storage filamentary structures prelithiated, may be stored in roll format, or provided into a battery having a jelly roll structure, where the first side 103-1 of the electrically conductive substrate 103 faces outwardly with respect to the roll center and the second side 103-2 faces inwardly.

In some embodiments, only the lithium storage filamentary structures are prelithiated. In some embodiments, the lithiated filamentary structures may absorb expansion stresses with minimal stress transference to the current collector.

In some embodiments the current collector may include vias or have a mesh structure so that both sides are in fluid communication with respect to a solution-based electrolyte when assembled into a battery. In this way, a non-prelithiated side of the anode may partly benefit from the lithiated side of the anode (e.g., with respect to overcoming first cycle lithium losses in the system), even when assembled into multilayer stacks or a jellyroll form that include a cathode and separator. In some embodiments, the cathode may have vias or a mesh structure.

Thermal treatments were discussed above with respect to prelithiation and the surface layer, but in some embodiments the anode may be thermally treated prior to battery assembly (after deposition of the lithium storage layer and lithium storage filamentary structures is complete, but before the anode is combined with a cathode in a battery cell), with or without a prelithiation step. In some embodiments, thermally treating the anode may improve adhesion of the various layers, improve charge capacity, improve charging rates, or improve electrical conductivity. In some embodiments, thermally treating the anode may be done in a controlled environment, e.g., under vacuum, argon, or nitrogen having a low oxygen and water content (e.g., less than 100 ppm or partial pressure of less than 10 Torr, alternatively less than 1 Torr, alternatively less than 0.1 Torr to prevent degradation). Herein, "under vacuum" generally refers to a reduced pressure condition wherein the total pressure of all gasses (e.g. in a vacuum oven) is less than 10 Torr. Due to equipment limitations, the vacuum pressure is typically greater than about $10^{-8}$ Torr. In some embodiments, anode thermal treatment may be carried out using an oven, a tube furnace, infrared heating elements, contact with a hot surface (e.g. a hot plate), or exposure to a flash lamp. The anode thermal treatment temperature and time depend on the materials of the anode. In some embodiments, anode thermal treatment includes heating the anode to a temperature of at least 50° C., optionally in a range of 50° C. to 600° C., alternatively 100° C. to 250° C., alternatively 250° C. to 350° C., alternatively 350° C. to 450° C., alternatively 450° C. to 600° C., alternatively 600° C. to 700° C., alternatively 700° C. to 800° C., or any combination of contiguous ranges thereof. In some embodiments, the anode thermal treatment time may be in a range of about 0.1 min to about 1 min, alternatively about 1 min to about 5 mins, alternatively about 5 mins to about 10 mins, alternatively about 10 mins to about 30 minutes, alternatively about 30 mins to about 60 mins, alternatively about 60 mins to about 90 mins, alternatively in a range of about 90 mins to about 120 mins, or any combination of contiguous ranges thereof.

In some embodiments one or more processing steps described above may be performed using roll-to-roll methods wherein the electrically conductive substrate is in the form of a rolled film, e.g., a roll of metal foil. In some embodiments, processing of the anode may include contact of the lithium storage layer with rollers or other conveyance or transport features of the processing equipment, with less or no substantial contact of the lithium storage filamentary structures with such rollers or other conveyance or transport features of the processing equipment.

Battery Features

The preceding description relates primarily to the anode/negative electrode of a lithium-ion battery (LIB). The LIB typically includes a cathode/positive electrode, an electrolyte and a separator (if not using a solid-state electrolyte). As is well known, batteries can be formed into multilayer stacks of anodes and cathodes with an intervening separator. Alternatively, a single anode/cathode stack can be formed into a so-called jellyroll. Such structures are provided into an appropriate housing having desired electrical contacts.

In some embodiments, the battery may be constructed with confinement features to limit expansion of the battery, e.g., as described in US published applications 2018/0145367 and 2018/0166735, the entire contents of which are incorporated herein by reference. In some embodiments a physical pressure is applied between the anode and cathode, e.g., using a tensioned spring or clip, a compressible film or the like. Confinement, pressure, or both may help ensure that the anode remains in active contact with the current collector during formation and cycling, which may cause expansion and contraction of the lithium storage layer and/or the lithium storage filamentary structures.

Figure 8:
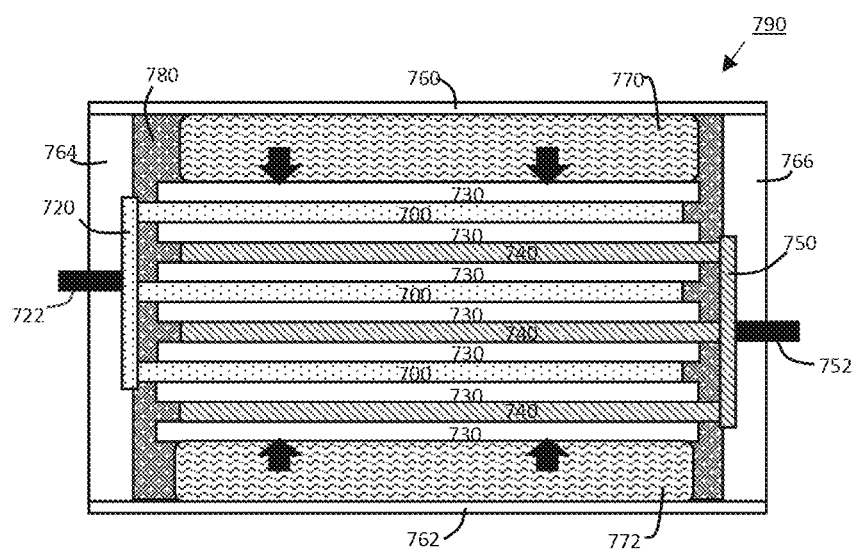
FIG. 8 is a cross-sectional view of a battery according to some embodiments of the present disclosure.

FIG. 8 is a schematic cross-sectional view of a battery according to some embodiments of the present disclosure. Battery 790 includes top plate 760, bottom plate 762, anode side plate 764 and cathode side plate 766, which form part of a housing for the stack of anodes 700, cathodes 740 and intervening separators 730. Anodes are attached to an anode bus 720 which is connected to anode lead 722 that extends through anode side plate 764. Cathodes are attached to a cathode bus 750 which is connected to cathode lead 752 that extends through cathode side plate 766. Battery 790 further includes electrolyte 780 which fills the space and saturates the separators 730. Top compression member 770 and lower compression member 772 apply physical pressure (arrows) between the anodes and cathodes. Compression members may be compressible films, e.g., made from a porous polymer or silicone. Alternatively, compression members may include an array of compressible features, e.g., made from porous polymer or silicone. Alternatively, the compression members may include springs or an array of springs. Alternatively, compression members may correspond to two sides of a compression clip or clamp. In some embodiments, the separator may act as a compressible film. In some embodiments the top and bottom plates may be formed a material and/or structured to resist deformation thereby confining battery swell.

Cathode

Positive electrode (cathode) materials include, but are not limited to, lithium metal oxides or compounds (e.g., $LiCoO_2$, $LiFePO_4$, $LiMnO_2$, $LiNiO_2$, $LiMn_2O_4$, $LiCoPO_4$, $LiNi_xCo_yMn_zO_2$, $LiNixCo_yAlzO_2$, $LiFe_2(SO_4)_3$, or $Li_2FeSiO_4$), carbon fluoride, metal fluorides such as iron fluoride ($FeF_3$), metal oxide, sulfur, selenium, sulfur-selenium and combinations thereof. Cathode active materials are typically provided on, or in electrical communication with, an electrically conductive cathode current collector.

In some embodiments, a prelithiated anode of the present disclosure is used with cathode including sulfur, selenium, or both sulfur and selenium (collectively referred to herein as "chalcogen cathodes"). In some embodiments, a prelithiated anode of the present disclosure may be paired with a chalcogen cathode having an active material layer, wherein the active material layer may include a carbon material and a compound selected from the group consisting of Se, $Se_yS_x$, $Te_yS_x$, $Te_zSe_yS_x$, and combinations thereof, where x, y and z are any value between 0 and 1, the sum of y and x being 1, and the sum of z, y and x being 1, the compound impregnated in the carbon material, e.g., as described in US published application 2019/0097275, which is incorporated by reference herein for all purposes. The compound may be present in an amount of 9-90% by weight based on the total weight of the active material layer. In some embodiments, the chalcogen cathode active material layer further includes conductive carbon nanotubes to improve overall conductivity and physical durability and may permit faster charging and discharging. The presence of carbon nanotubes may further allow thicker coatings that have greater flexibility thereby allowing higher capacity.

Chalcogen cathodes are generally paired with lithium metal anodes. However, lithium metal anodes are difficult to handle, prone to degradation, and may further allow formation of dangerous dendritic lithium that can lead to catastrophic shorts. In some embodiments, prelithiated anodes of the present disclosure can achieve equivalent energy storage capacity of a pure lithium anode, but are much easier to handle and less prone to form dendritic lithium, thus making them more compatible with chalcogen cathodes.

In some embodiments, different cathode active material layers may be provided on opposite sides of the cathode current collector such that, in the battery, a first cathode active material layer may face the anode lithium storage layer and a second cathode active material layer may face the plurality of lithium storage filaments.

Current Separator

The current separator allows ions to flow between the anode and cathode but prevents direct electrical contact. Such separators are typically porous sheets. Non-aqueous lithium-ion separators are single layer or multilayer polymer sheets, typically made of polyolefins, especially for small batteries. Most commonly, these are based on polyethylene or polypropylene, but polyethylene terephthalate (PET) and polyvinylidene fluoride (PVDF) can also be used. For example, a separator can have >30% porosity, low ionic resistivity, a thickness of ~10 to 50 µm and high bulk puncture strengths. Separators may alternatively include glass materials, ceramic materials, a ceramic material embedded in a polymer, a polymer coated with a ceramic, or some other composite or multilayer structure, e.g., to provide higher mechanical and thermal stability. As mentioned, the separator may include a lithiation material such as lithium metal, a reducing lithium compound, or an SLMP material coated at least on the side facing the anode.

Electrolyte

The electrolyte in lithium ion cells may be a liquid, a solid, or a gel. A typical liquid electrolyte comprises one or more solvents and one or more salts, at least one of which includes lithium. During the first few charge cycles (sometimes referred to as formation cycles), the organic solvent and/or the electrolyte may partially decompose on the negative electrode surface to form an SEI (Solid-Electrolyte-Interphase) layer. The SEI is generally electrically insulating but ionically conductive, thereby allowing lithium ions to pass through. The SEI may lessen decomposition of the electrolyte in the later charging cycles.

Some non-limiting examples of non-aqueous solvents suitable for some lithium ion cells include the following: cyclic carbonates (e.g., ethylene carbonate (EC), fluoroethylene carbonate (FEC), propylene carbonate (PC), butylene carbonate (BC) and vinylethylene carbonate (VEC)), vinylene carbonate (VC), lactones (e.g., gamma-butyrolactone (GBL), gamma-valerolactone (GVL) and alpha-angelica lactone (AGL)), linear carbonates (e.g., dimethyl carbonate (DMC), methyl ethyl carbonate (MEC, also commonly abbreviated EMC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitriles (e.g., acetonitrile and adiponitrile) linear esters (e.g., methyl propionate, methyl pivalate, butyl pivalate and octyl pivalate), amides (e.g., dimethyl formamide), organic phosphates (e.g., trimethyl phosphate and trioctyl phosphate), organic compounds containing an S=O group (e.g., dimethyl sulfone and divinyl sulfone), and combinations thereof.

Non-aqueous liquid solvents can be employed in combination. Examples of these combinations include combinations of cyclic carbonate-linear carbonate, cyclic carbonate-lactone, cyclic carbonate-lactone-linear carbonate, cyclic carbonate-linear carbonate-lactone, cyclic carbonate-linear carbonate-ether, and cyclic carbonate-linear carbonate-linear ester. In some embodiments, a cyclic carbonate may be combined with a linear ester. Moreover, a cyclic carbonate may be combined with a lactone and a linear ester. In some embodiments, the weight ratio, or alternatively the volume ratio, of a cyclic carbonate to a linear ester is in a range of 1:9 to 10:1, alternatively 2:8 to 7:3

A salt for liquid electrolytes may include one or more of the following non-limiting examples: $LiPF_6$, $LiBF_4$, $LiClO_4$, $LiAsF_6$, $LiN(CF_3SO_2)_2$, $LiN(C_2F_5SO_2)_2$, $LiCF_3SO_3$, $LiC(CF_3SO_2)_3$, $LiPF_4(CF_3)_2$, $LiPF_3(C_2F_5)_3$, $LiPF_3(CF_3)_3$, $LiPF_3$ (iso-$C_3F_7$)$_3$, $LiPF_5$(iso-$C_3F_7$), lithium salts having cyclic alkyl groups (e.g., $(CF_2)_2(SO_2)_{2x}Li$ and $(CF_2)_3(SO_2)_{2x}Li$), and combinations thereof. Common combinations include: $LiPF_6$ and $LiBF_4$; $LiPF_6$ and $LiN(CF_3SO_2)_2$; and $LiBF_4$ and $LiN(CF_3SO_2)_2$.

In some embodiments, the total concentration of salt in a liquid non-aqueous solvent (or combination of solvents) is at least 0.3 M, alternatively at least 0.7M. The upper concentration limit may be driven by a solubility limit and operational temperature range. In some embodiments, the concentration of salt is no greater than about 2.5 M, alternatively no more than about 1.5 M.

In some embodiments, the battery electrolyte includes a non-aqueous ionic liquid and a lithium salt.

A solid-state electrolyte may be used without the separator because it serves as the separator itself. It is electrically insulating, ionically conductive, and electrochemically stable. In the solid electrolyte configuration, a lithium containing salt, which could be the same as for the liquid electrolyte cells described above, is employed but rather than being dissolved in an organic solvent, it is held in a solid matrix, which may include inorganic materials or a polymer composite. In some embodiments, a solid-state electrolyte may be vapor deposited, solution-coated, melt-coated or a combination thereof. Examples of solid polymer electrolytes may be ionically conductive polymers prepared from monomers containing atoms having lone pairs of electrons available for the lithium ions of electrolyte salts to attach to and move between during conduction, such as polyvinylidene fluoride (PVDF) or chloride or copolymer of their derivatives, poly(chlorotrifluoroethylene), poly(ethylene-chlorotrifluoro-ethylene), or poly(fluorinated ethylene-propylene), polyethylene oxide (PEO) and oxymethylene linked PEO, PEO-PPO-PEO crosslinked with trifunctional urethane, poly(bis(methoxy-ethoxy-ethoxide))-phosphazene (MEEP), triol-type PEO crosslinked with difunctional urethane, poly((oligo)oxyethylene)methacrylate-co-alkali metal methacrylate, polyacrylonitrile (PAN), polymethylmethacrylate (PMMA), polymethylacrylonitrile (PMAN), polysiloxanes and their copolymers and derivatives, acrylate-based polymer, other similar solvent-free polymers, combinations of the foregoing polymers either condensed or cross-linked to form a different polymer, and physical mixtures of any of the foregoing polymers. Other less conductive polymers that may be used in combination with the above polymers to improve the strength of thin laminates include: polyester (PET), polypropylene (PP), polyethylene naphthalate (PEN), polyvinylidene fluoride (PVDF), polycarbonate (PC), polyphenylene sulfide (PPS), and polytetrafluoroethylene (PTFE). Such solid polymer electrolytes may further include a small amount of organic solvents listed above. The polymer electrolyte may be an ionic liquid polymer. Such polymer-based electrolytes can be coated using any number of conventional methods such as curtain coating, slot coating, spin coating, inkjet coating, spray coating or other suitable method.

Additives may be included in the electrolyte to serve various functions. For example, additives such as polymerizable compounds having an unsaturated double bond may be added to stabilize or modify the SEI. Certain amines or borate compounds can act as cathode protection agents. Lewis acids can be added to stabilize fluorine-containing anion such as $PF_6^-$. Safety protection agents include those to protect overcharge, e.g., anisoles, or act as fire retardants, e.g., alkyl phosphates.

In some embodiments, the original, non-cycled anode may undergo structural or chemical changes during electrochemical charging/discharging, for example, from normal battery usage or from an earlier "electrochemical formation step". As is known in the art, an electrochemical formation step is commonly used to form an initial SEI layer and involves relatively gentle conditions of low current and limited voltages. The modified anode prepared in part from such electrochemical charging/discharging cycles may still have excellent performance properties, despite such structural and/or chemical changes relative to the original, non-cycled anode.

EXAMPLES

Example 1 Current Collector

A current collector was prepared by oxidation of a 16 μm thick nickel foil. The foil was provided into a muffle furnace under air at room temp, heated to 700° C. and held there for 30 minutes. The furnace was turned off and the sample was allowed to cool within the furnace. The layer of nickel oxide was approximately 0.2-0.6 μm thick. Example 1 Current Collector may correspond to the first side of an electrically conductive substrate according to some embodiments of the present disclosure.

Example 2 Current Collector

The same kind of nickel foil as used in the Example 1 Current Collector simply cleaned with an IPA wipe and not subjected to any oxidation treatments. Example 2 Current Collector may correspond to the second side of an electrically conductive substrate according to some embodiments of the present disclosure.

Silicon Deposition

Silicon was concurrently deposited over the example current collectors using expanding thermal PECVD to form corresponding Example Anode 1 (from Example 1 Current Collector) and Example Anode 2 (from Example 2 Current Collector. The formation gases were silane at about 0.20 slm (standard liters per minute) and hydrogen at about 0.20 slm, along with an argon carrier gas at about 2 slm. The process pressure was about 0.145 mbar.

Characterization

ICP-AES analysis showed Anode 1 had about 1.2 mg/cm$^2$ of total silicon and Anode 2 had about 2.4 mg/cm$^2$ of total silicon. In the case of Anode 2, some of this silicon was in the form of nickel silicide, which has lower lithium storage capacity than amorphous silicon.

Figure 9A:
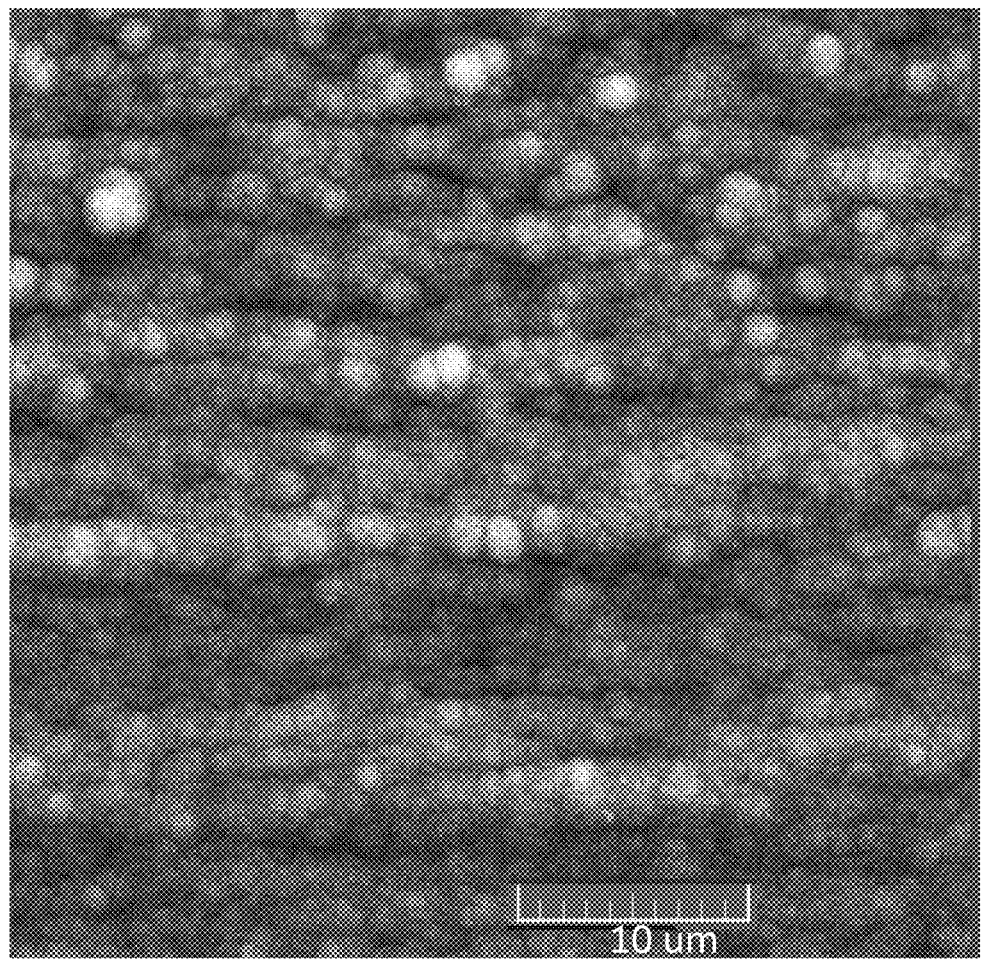
FIG. 9A is a top-view SEM of an anode having a lithium storage layer according to an embodiment of the present disclosure
Figure 9B:
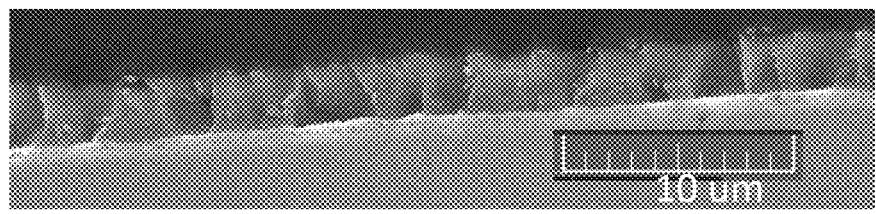
FIG. 9B is a cross-sectional SEM of the anode of FIG. 9A.
Figure 10:
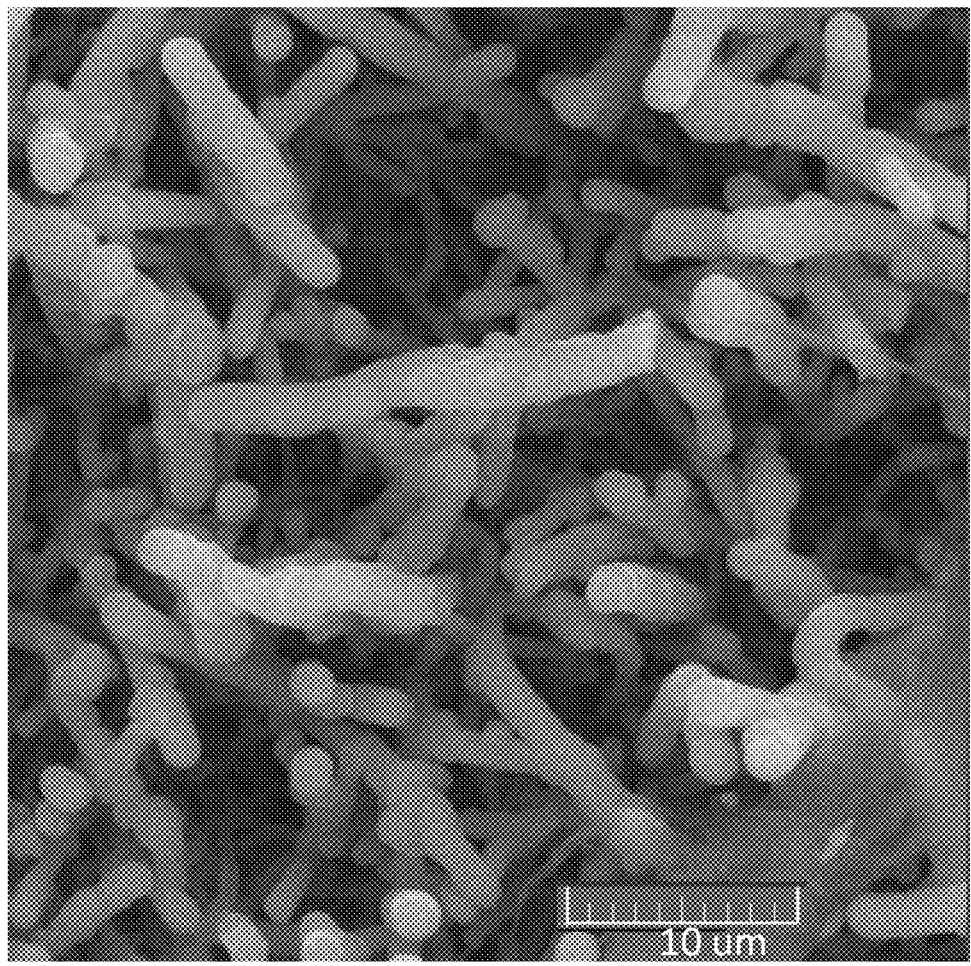
FIG. 10 is a top-view SEM of an anode having lithium storage filamentary structures according to an embodiment of the present disclosure

Anode 1 had a silvery, metallic appearance, although not mirror-like. In contrast, Anode 2 had a black appearance. Microstructure differences between the anodes are readily apparent as shown in FIGS. 9-10. FIG. 9A is an SEM top view of Anode 1, and for reference, 9B is an SEM cross-sectional view. Anode 1 includes a continuous porous lithium storage layer. Unlike Anode 2, there is no evidence of lithium storage filamentary structures. FIG. 9B shows that the continuous porous lithium storage layer may have some vertical fissures or pockets, but there is lateral connectivity and it is substantially free of nanostructures. Other analyses showed that this layer includes primarily amorphous silicon. FIG. 10 is an SEM top view of Anode 2 showing the plurality of lithium storage filamentary structures that formed having a maximum width generally in a range of about 2 to 3 μm. Unlike Anode 1, there is no evidence of a continuous silicon layer. Other analyses showed that the Anode 2 structures included nickel silicides and amorphous silicon.

When tested in half cells, both anodes showed reasonable cycle life and lithium storage capacity.

Although Anode 1 and Anode 2 were separate anodes, the data clearly show that anodes of the present disclosure having a lithium storage layer on one side and lithium storage filamentary structures on the other side can be made simply, and concurrently, using the same PECVD process on both sides of the electrically conductive substrate. As mentioned, the lithium storage layer and the lithium storage filamentary structures may instead be made under different CVD process conditions, or in separate steps, for example, to optimize the performance of each side.

In some embodiments, the original, non-cycled anode may undergo structural or chemical changes during electrochemical charging/discharging, for example, from normal battery usage or from an earlier "electrochemical formation step". As is known in the art, an electrochemical formation step is commonly used to form an initial SEI layer and involves relatively gentle conditions of low current and limited voltages. The modified anode prepared in part from such electrochemical charging/discharging cycles may still have excellent performance properties, despite such structural and/or chemical changes relative to the original, non-cycled anode.

Although the present anodes have been discussed with reference to batteries, in some embodiments the present anodes may be used in hybrid capacitor devices. Relative to conventional anodes, the anodes of the present disclosure may have one or more of at least the following unexpected advantages: comparable or improved stability at aggressive ≥1C charging rates; higher overall areal charge capacity; higher gravimetric charge capacity; higher volumetric charge capacity; improved physical durability; simplified manufacturing process; and/or a more reproducible manufacturing process.

Some non-limiting representative embodiments are listed below.

1. An anode for an energy storage device comprising:
   a current collector comprising an electrically conductive substrate and a surface layer overlaying a first side of the electrically conductive substrate;
   a lithium storage layer overlaying the surface layer; and
   a plurality of lithium storage filamentary structures in contact with a second side of the electrically conductive substrate, the second side opposite the first side.

2. The anode of embodiment 1, wherein the surface layer comprises a metal oxide.

3. The anode of embodiment 2, wherein the metal oxide comprises a transition metal oxide.

4. The anode of embodiment 2 or 3, wherein the metal oxide comprises an oxide of nickel, an oxide of copper, an oxide of titanium, or a combination thereof.

5. The anode according to any of embodiments 1-4, wherein the surface layer comprises a metal chalcogenide comprising at least one of sulfur or selenium.

6. The anode of embodiment 5, wherein the metal chalcogenide comprises a transition metal sulfide, a transition metal polysulfide, a metal transition selenide, or a transition metal polyselenide.

7. The anode of embodiment 5 or 6, wherein the metal chalcogenide is a copper chalcogenide.

8. The anode according to any of embodiments 1-7, wherein the surface layer has an average thickness in a range of in a range of 0.02 µm to 2 µm.

9. The anode according to any of embodiments 1-8, wherein the electrically conductive substrate comprises stainless steel, titanium, nickel, copper, a conductive carbon, or a combination thereof.

10. The anode according to any of embodiments 1-9, wherein the lithium storage layer is a continuous porous lithium storage layer.

11. The anode according to any of embodiments 1-10, wherein the lithium storage layer has a total content of silicon, germanium, or a combination thereof of at least 40 atomic %.

12. The anode according to any of embodiments 1-11, wherein the lithium storage layer includes less than 10 atomic % carbon.

13. The anode according to any of embodiments 1-12, wherein the lithium storage layer is substantially free of nanostructures.

14. The anode according to any of embodiment 1-13, wherein the lithium storage layer is a continuous porous lithium storage layer comprising amorphous silicon having an areal density of at least 0.2 mg/cm$^2$ and the total content of silicon is at least 40 atomic %.

15. The anode according to any of embodiment 1-14, wherein the lithium storage layer has an average thickness in a range from 0.5 µm to 40 µm.

16. The anode according to any of embodiment 1-15, wherein the lithium storage layer is a continuous porous lithium storage layer having an average density from 1.1 g/cm$^3$ to 2.25 g/cm$^3$ and comprises at least 85 atomic % amorphous silicon.

17. The anode according to any of embodiments 1-16, wherein the plurality of lithium storage filamentary structures has an aspect ratio of at least 2.

18. The anode according to any of embodiments 1-17, wherein the plurality of lithium storage filamentary structures has an average height in a range of 0.2 µm to 100 µm 19. The anode according to any of embodiments 1-18, wherein the plurality of lithium storage filamentary structures has an average maximum width in a range of 0.1 µm to 10 µm.

20. The anode according to any of embodiments 1-19, wherein the plurality of lithium storage filamentary structures comprises silicon, germanium, tin, or a combination thereof.

21. The anode according to embodiment 20, wherein the plurality of lithium storage filamentary structures further comprises a transition metal silicide or transition metal alloy of germanium.

22. The anode according to any of embodiments 1-21, wherein each lithium storage filamentary structure of the plurality of lithium storage filamentary structures comprises a core filament and a lithium storage coating over the core filament.

23. The anode according to embodiment 22 wherein the core filament comprises a transition metal silicide or a transition metal alloy of germanium.

24. The anode according to embodiment 22 or 23, wherein the lithium storage coating comprises silicon, germanium, or a mixture thereof.

25. The anode according to any of embodiments 1-24, wherein the lithium storage filamentary structures have a total content of silicon, germanium, or a combination thereof of at least 40 atomic %.

26. The anode according to any of embodiments 1-25, wherein the second side of the electrically conductive substrate comprises a filament growth catalyst material.

27. The anode according to any of embodiments 1-26, wherein the lithium storage layer and the plurality of lithium storage filamentary structures both comprise silicon.

28. The anode according to any of embodiments 1-27, wherein the electrically conductive substrate comprises:
   i) a first electrically conductive layer corresponding to the first side of the electrically conductive substrate;
   ii) a second electrically conductive layer corresponding to the second side of the electrically conductive substrate; and iii) an electrically insulating layer interposed between the first electrically conductive layer and the second electrically conductive layer.

29. A lithium-ion battery comprising a cathode and the anode according to any of embodiments 1-28.

30. The lithium-ion battery of embodiment 29, wherein the anode is prelithiated and the cathode comprises sulfur, selenium, or both sulfur and selenium.

31. The lithium-ion battery of embodiment 29 or 30, wherein the lithium storage layer is electrically addressable independently of the plurality of lithium storage filamentary structures.

32. A method of making an anode for use in an energy storage device, the method comprising:
providing a current collector comprising an electrically conductive substrate and a surface layer overlaying a first side of the electrically conductive substrate, wherein a second side of the electrically conductive substrate comprises a filament growth catalyst, wherein the second side is opposite the first side;
depositing a lithium storage layer onto the surface layer using a first CVD process; and
forming a plurality of lithium storage filamentary structures on the second side of the electrically conductive substrate using a second CVD process.

33. The method of embodiment 32, wherein at least one of the first CVD process or the second CVD process comprises a PECVD process.

34. The method of embodiment 32 or 33, wherein the first CVD process is a first PECVD process and the second CVD process is a second PECVD process.

35. The method of according to any of embodiments 32-34, wherein the lithium storage layer comprises silicon, germanium, or a combination thereof.

36. The method according to any of embodiments 32-35, wherein the plurality of lithium storage filamentary structures comprise silicon, germanium, or a combination thereof.

37. The method according to any of embodiments 32-36, wherein the first CVD process is different than the second CVD process.

38. The method according to any of embodiments 32-36, wherein the first CVD process is substantially the same as the second CVD process.

39. The method according to any of embodiments 32-38, wherein the lithium storage layer is deposited prior to or after forming the plurality of lithium storage filamentary structures.

40. The method according to any of embodiments 32-38, wherein depositing the lithium storage layer is concurrent with forming the lithium storage filamentary structures.

41. The method according to any of embodiments 32-40, wherein the surface layer comprises a metal oxide.

42. The method of embodiment 41, wherein the metal oxide comprises a transition metal oxide.

43. The method of embodiment 40 or 41, wherein the metal oxide comprises an oxide of nickel, an oxide of copper, an oxide of titanium, or a combination thereof.

44. The method according to any of embodiments 32-43, wherein the surface layer comprises a metal chalcogenide comprising at least one of sulfur or selenium.

45. The method of embodiment 44, wherein the metal chalcogenide comprises a transition metal sulfide, a transition metal polysulfide, a metal transition selenide, or a transition metal polyselenide.

46. The method of embodiment 44 or 45, wherein the metal of the chalcogenide is a copper chalcogenide.

47. The method according to any of embodiments 32-46, wherein the surface layer has an average thickness in a range of in a range of 0.02 μm to 2 μm.

48. The method according to any of embodiments 32-47, wherein the electrically conductive substrate comprises stainless steel, titanium, nickel, copper, a conductive carbon, or a combination thereof.

49. The method according to any of embodiments 32-48, wherein the filament growth catalyst comprises nickel.

50. The method according to any of embodiments 32-49, wherein the lithium storage layer is a continuous porous lithium storage layer having an average density from 1.1 g/cm$^3$ to 2.25 g/cm$^3$ and comprises at least 85 atomic % amorphous silicon, and wherein the plurality of lithium storage filamentary structures comprise silicon.

51. A lithium-ion battery comprising a cathode and the anode made by the method according to any of embodiments 32-50.

52. The lithium-ion battery of embodiment 51, wherein the anode is prelithiated and the cathode comprises sulfur, selenium, or both sulfur and selenium.

53. The lithium-ion battery of embodiment 52, wherein the cathode further comprises carbon nanotubes.

54. The lithium-ion battery according to any of embodiments 51-53, wherein the lithium storage layer is electrically addressable independently of the plurality of lithium storage filamentary structures.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Additionally, details of any specific embodiment may not always be present in variations of that embodiment or may be added to other embodiments.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range.

Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the layer" includes reference to one or more layers and equivalents thereof known to those skilled in the art, and so forth. The invention has now been described in detail for the purposes of clarity and understanding. However, it will be appreciated that certain changes and modifications may be practiced within the scope of the appended claims.

All publications, patents, and patent applications cited herein are hereby incorporated by reference in their entirety for all purposes. None is admitted to be prior art.

We claim:

1. An anode for an energy storage device comprising:
    a current collector comprising an electrically conductive substrate and a surface layer overlaying a first side of the electrically conductive substrate, wherein the surface layer comprises a metal oxide or a metal chalcogenide;
    a lithium storage layer overlaying the surface layer, wherein the lithium storage layer: i) has a total content of amorphous silicon of at least 85 atomic %, and ii) includes less than 10 atomic % carbon; and
    a plurality of lithium storage filamentary structures in contact with a second side of the electrically conductive substrate, the second side opposite the first side, wherein the plurality of lithium storage filamentary structures comprises silicon, germanium, tin, or a combination thereof.

2. The anode of claim 1, wherein the metal oxide comprises a transition metal oxide.

3. The anode of claim 1, wherein the surface layer comprises the metal chalcogenide, and the metal chalcogenide comprises at least one of sulfur or selenium.

4. The anode of claim 1, wherein the surface layer has an average thickness in a range of in a range of 0.02 μm to 2 μm.

5. The anode of claim 1, wherein the electrically conductive substrate comprises stainless steel, titanium, nickel, copper, a conductive carbon, or a combination thereof.

6. The anode of claim 1, wherein the lithium storage layer has an average thickness in a range from 0.5 μm to 40 μm.

7. The anode of claim 1, wherein the lithium storage layer is a continuous porous lithium storage layer having an average density from 1.1 g/cm$^3$ to 2.25 g/cm$^3$.

8. The anode of claim 1, wherein the plurality of lithium storage filamentary structures has an aspect ratio of at least 2.

9. The anode of claim 1, wherein the plurality of lithium storage filamentary structures has an average height in a range of 0.2 μm to 100 μm.

10. The anode of claim 1, wherein the plurality of lithium storage filamentary structures has an average maximum width in a range of 0.1 μm to 10 μm.

11. The anode of claim 1, wherein the plurality of lithium storage filamentary structures further comprises a transition metal silicide or transition metal alloy of germanium.

12. The anode of claim 1, wherein each lithium storage filamentary structure of the plurality of lithium storage filamentary structures comprises a core filament and a lithium storage coating over the core filament.

13. The anode of claim 12, wherein the core filament comprises a transition metal silicide or a transition metal alloy of germanium.

14. The anode of claim 12, wherein the lithium storage coating comprises silicon, germanium, or a mixture thereof.

15. The anode of claim 1, wherein the lithium storage filamentary structures have a total content of silicon, germanium, or a combination thereof of at least 40 atomic %.

16. The anode of claim 1, wherein the second side of the electrically conductive substrate comprises a filament growth catalyst material.

17. The anode of claim 1, wherein the lithium storage layer and the plurality of lithium storage filamentary structures both comprise silicon.

18. The anode of claim 1, wherein the electrically conductive substrate comprises:
    i) a first electrically conductive layer corresponding to the first side of the electrically conductive substrate;
    ii) a second electrically conductive layer corresponding to the second side of the electrically conductive substrate; and
    iii) an electrically insulating layer interposed between the first electrically conductive layer and the second electrically conductive layer.

19. A lithium-ion battery comprising a cathode and the anode according to claim 1.

20. The anode of claim 1, wherein the plurality of lithium storage filamentary structures has a total content of amorphous silicon of at least 80 atomic %.

* * * * *